US012736132B2

(12) United States Patent
Leeser et al.

(10) Patent No.: US 12,736,132 B2
(45) Date of Patent: Sep. 15, 2026

(54) MULTI-LAYER AND MULTI-RINGED SEALS FOR PREVENTING PERMEATION AND LEAK-BY OF FLUID

(71) Applicant: LAM RESEARCH CORPORATION, Fremont, CA (US)

(72) Inventors: Karl Frederick Leeser, West Linn, OR (US); Bradley Taylor Streng, Tigard, OR (US); Nick Ray Linebarger, Jr., Beaverton, OR (US)

(73) Assignee: Lam Research Corporation, Fremont, CA (US)

( * ) Notice: Subject to any disclaimer, the term of this patent is extended or adjusted under 35 U.S.C. 154(b) by 280 days.

(21) Appl. No.: 18/031,206

(22) PCT Filed: Oct. 18, 2021

(86) PCT No.: PCT/US2021/055364
§ 371 (c)(1),
(2) Date: Apr. 11, 2023

(87) PCT Pub. No.: WO2022/086836
PCT Pub. Date: Apr. 28, 2022

(65) Prior Publication Data

US 2023/0417326 A1 Dec. 28, 2023

Related U.S. Application Data

(60) Provisional application No. 63/104,250, filed on Oct. 22, 2020.

(51) Int. Cl.
*F16J 15/00* (2006.01)
*F16J 15/10* (2006.01)

(52) U.S. Cl.
CPC .......... *F16J 15/006* (2013.01); *F16J 15/004* (2013.01); *F16J 15/104* (2013.01)

(58) Field of Classification Search
CPC .......... F16J 15/00; F16J 15/002; F16J 15/006; F16J 15/08; F16J 15/104; F16J 15/0887
See application file for complete search history.

(56) References Cited

U.S. PATENT DOCUMENTS 3,313,553 A * 4/1967 Gastineau ................ F16J 15/46 277/910
4,902,198 A * 2/1990 North ........................ F01D 9/04 415/115

(Continued)

FOREIGN PATENT DOCUMENTS

| | | | |
|---|---|---|---|
| JP | 2014085019 | A | 5/2014 |
| KR | 20050097362 | A | 10/2005 |
| KR | 20170075829 | A | 7/2017 |

OTHER PUBLICATIONS

International Search Report and Written Opinion of the ISA issued in PCT/US2021/055364, mailed Feb. 9, 2022; ISA/KR.

(Continued)

*Primary Examiner* — Christine M Mills
*Assistant Examiner* — L. Susmitha Koneru

(57) ABSTRACT

A seal to prevent fluid through a first interface between the seal and a first body, includes first and second band members and a bridge member. The first band member defines a first band seal surface on first side of the first band member. The first band member is configured to provide a first fluid seal with the first body when compressed to the first body. The second band member defines a second band seal surface on a first side of the second band member. The second band member is configured to provide a second fluid seal with the first body when compressed to the first body. The first band member and the second band member at least partially define a cavity between the first band member and the (Continued)

second band member. The bridge member extends through the cavity and connects the first band member to the second band member.

40 Claims, 12 Drawing Sheets

(56) References Cited

U.S. PATENT DOCUMENTS

| | | | | |
|---|---|---|---|---|
| 7,788,932 | B2 * | 9/2010 | Kunitake | F02C 7/28 60/797 |
| 8,052,155 | B2 * | 11/2011 | Amos | F16J 15/0887 415/173.2 |
| 9,017,015 | B2 * | 4/2015 | Casavant | F01D 11/005 415/134 |
| 9,182,039 | B2 * | 11/2015 | Aschenbruck | F01D 11/005 |
| 9,360,114 | B2 | 6/2016 | Trompenaars | |
| 2003/0161725 | A1 * | 8/2003 | Hirst | F01D 11/005 415/170.1 |
| 2004/0240986 | A1 * | 12/2004 | Burdgick | F16J 15/122 415/139 |
| 2005/0179215 | A1 * | 8/2005 | Kono | F16J 15/0887 277/628 |
| 2006/0091617 | A1 * | 5/2006 | Minnich | F01D 11/005 277/628 |
| 2008/0075223 | A1 * | 3/2008 | Ohsono | F16J 15/0893 376/272 |
| 2012/0299252 | A1 * | 11/2012 | Singh | H01L 21/67126 277/641 |
| 2013/0028713 | A1 * | 1/2013 | Giri | F16J 15/064 415/135 |
| 2015/0102566 | A1 * | 4/2015 | Hanumanthan | F01D 11/005 277/591 |
| 2015/0137508 | A1 * | 5/2015 | Lehr | C23C 24/082 285/145.4 |
| 2016/0245434 | A1 * | 8/2016 | Seeley | G01M 3/2861 |

OTHER PUBLICATIONS

Office Action issued in corresponding Korean App. No. 1020237016807 dated May 28, 2025.

* cited by examiner 100
150
160
Gas Source
Valve
MFC
152-1
152-2
152-N
154-1
154-2
154-N
156-1
156-2
156-N
Species Delivery Assembly
Species Exhaust Assembly
Transport Assembly
Valve
Pump
Robot
System Controller
102
104
106
108
110
112
114
115
116
117
118
119
120
122
124
124A
124B
126
128
130
132
140
142
176
178
190
Key
Electrical
Air/Gas/Fluid 410
420
400
410
410
404
406
413
410
410
402
410
410
410

500
522
513
502
550
552
G
506
508
504
ATM
520
Vacuum
531
560
535
536
537
538
511
530
$P_1$
$P_2$
$P_3$
510
556
542
524
554
532
539
534
525
Pump
Pump
540
541

MULTI-LAYER AND MULTI-RINGED SEALS FOR PREVENTING PERMEATION AND LEAK-BY OF FLUID

CROSS-REFERENCE TO RELATED APPLICATIONS

This application is a U.S. National Phase Application under 35 U.S.C. 371 of International Application No. PCT/US2021/055364, filed on Oct. 18, 2021, which claims the benefit of U.S. Provisional Application No. 63/104,250, filed on Oct. 22, 2020. The entire disclosures of the above is applications are incorporated herein by reference.

FIELD

The present disclosure relates to seals for preventing permeation and leak-by of fluid.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems may be used to perform etching, deposition, and/or other treatment of substrates such as semiconductor wafers. Example processes that may be performed on a substrate include, but are not limited to, a chemical vapor deposition (CVD) process, an atomic layer deposition (ALD) process, an ion implantation process, and/or other etch, deposition, and cleaning processes. As an example, during an etching process, a substrate may be arranged on an electrostatic chuck (ESC) in a substrate processing system and gases are supplied to etch the substrate. Plasma may be used to enhance chemical reactions.

Substrate processing environments are sensitive to interface leaks at seals, such as at O-rings. As an example, oxygen and/or water permeation through and "leak-by" around the seals can cause film oxidation and/or corrosion issues, which may cause defects.

SUMMARY

A seal to prevent fluid through a first interface between the seal and a first body is provided. The seal includes a first band member, a second band member and a bridge member. The first band member defines a first band seal surface on first side of the first band member. The first band member is configured to provide a first fluid seal with the first body when compressed to the first body. The second band member defines a second band seal surface on a first side of the second band member. The second band member is configured to provide a second fluid seal with the first body when compressed to the first body. The first band member and the second band member at least partially define a cavity between the first band member and the second band member. The bridge member extends through the cavity and connects the first band member to the second band member.

In other features, the bridge member is perforated. In other features, the first band member, the second band member and the bridge member are annular-shaped or rectangular-shaped.

In other features, the first band member separates a first region from the cavity. The second band member separates a second region from the cavity. The first region is at a first pressure. The second region is at a second pressure that is less than the first pressure. The cavity is at an intermediate pressure that is less than the first pressure and greater than or equal to the second pressure.

In other features, a diameter at a radially inner surface of the second band member is greater than a diameter at a radially outer surface of the first band member. The bridge member includes: a radially inner surface connected to the radially outer surface of the first band member; and a radially outer surface connected to the radially inner surface of the second band member.

In other features, the seal further includes one or more layers disposed on the first band member, the second band member and the bridge member.

In other features, the seal prevents fluid through a second interface between the first body and a second body. The first band member defines a third band seal surface on an opposite side as the first side and configured to provide a third fluid seal with the second body when compressed between the first body and the second body. The second band member defines a fourth band seal surface on an opposing side as the second band seal surface and configured to provide a fourth fluid seal with the second body when compressed between the first body and the second body. The cavity is between the first body and the second body.

In other features, the first band member and the second band member have open circularly-shaped cross-sections. The first band member includes a first inner edge. The second band member includes a second inner edge. When the first band member and the second band member are compressed between the first body and the second body, the first inner edge and the second inner edge move closer to the bridge member. In other features, a system is provided and includes the seal, the first body, the second body, a first pump and a controller. The second body includes a channel. The seal is disposed in the channel. The controller is configured to control the pump to evacuate the cavity, wherein the cavity is located in the channel between the first band member and the second band member.

In other features, a system is provided and includes the seal and a centering ring configured to support the seal.

In other features, a seal to prevent fluid through an interface between a first body and a second body is provided. The seal includes: a core formed of aluminum; and one or more layers disposed on an outer surface of the core and configured to define a first band seal surface and a second band seal surface when compressed between the first body and the second body, respectively. At least one of the one or more layers is formed of a perfluoroelastomer. In other features, the core is annular-shaped or rectangular-shaped.

In other features, the one or more layers include: a first layer disposed on the core and formed of a first material; and a second layer disposed on the first layer and formed of a second material, where the second material is different than the first material; and at least one of the first layer or the second layer is formed of a perfluoroelastomer. In other features, the seal is a spring energized seal.

In other features, a system is provided and includes the seal, the first body, the second body, a pump and a controller. The second body includes a first channel and a second channel. The seal is a first seal and is disposed in the first channel. The system further includes a second seal disposed in the second channel. The controller is configured to control operation of the pump to evacuate fluid from the interface via a plenum and at a location between the first body and the second body and between the first seal and the second seal.

In other features, a seal to prevent fluid through an interface between a first body and a second body is provided. The seal includes: a core formed of a polymer; and one or more layers disposed on the core and configured to define a first band seal surface and a second band seal surface when compressed between the first body and the second body, respectively. At least one of the one or more layers is formed of at least one of aluminum or a perfluoroelastomer. In other features, the core is annular-shaped or rectangular-shaped.

In other features, the seal includes: the one or more layers including a first layer disposed on the core and formed of a first material, and a second layer disposed on the first layer and formed of a second material, where the second material is different than the first material; and at least one of the first layer or the second layer is formed of at least one of aluminum or a perfluoroelastomer. In other features, the seal is a spring energized seal.

In other features, a system is provided and includes the seal, the first body, the second body, a pump and a controller. The second body includes a first channel and a second channel. The seal is a first seal and is disposed in the first channel. The system further includes a second seal disposed in the second channel. The controller is configured to control operation of the pump to evacuate fluid from a gap in the interface, wherein the gap is located between the first body and the second body and between the first seal and the second seal.

In other features, a seal to prevent fluid through an interface between a first body and a second body is provided. The seal includes a first band member, a second band member and a bridge member. The first band member defines first and second band seal surfaces on opposing sides thereof that are configured to provide first fluid seals with the first body and the second body, respectively, when compressed between the first body and the second body. The second band member defines third and fourth band seal surfaces on opposing sides thereof that are configured to provide second fluid seals with the first body and the second body, respectively, when compressed between the first body and the second body. The first band member and the second band member at least partially define a cavity between the first body and the second body. The bridge member extends through the cavity and connecting the first band member to the second band member.

In other features, the first band member, the second band member and the bridge member are annular-shaped. In other features, the first band member, the second band member and the bridge member are not annular-shaped. In other features, the first band member, the second band member and the bridge member are rectangular-shaped and include rounded corners.

In other features, the first band member separates a first region from the cavity. The second band member separates a second region from the cavity. The first region is at a first pressure. The second region is at a second pressure that is less than the first pressure. The cavity is at an intermediate pressure that is less than the first pressure and greater than or equal to the second pressure. In other features, the second fluid seals are located radially outside or below the first fluid seals.

In other features, a diameter at a radially inner surface of the second band member is greater than a diameter at a radially outer surface of the first band member. The bridge member includes a radially inner surface that is connected to the radially outer surface of the first band member and a radially outer surface that is connected to the radially inner surface of the second band member.

In other features, the seal further includes a third band member and a second bridge member. The third band member defines fifth and sixth band seal surfaces on opposing sides thereof that are configured to provide third fluid seals with the first body and the second body, respectively, when compressed between the first body and the second body. The third fluid seals are located radially outside of the second fluid seals and a diameter at a radially inner surface of the third band member is greater than a diameter at a radially outer surface of the second band member. The second band bridge member includes a radially inner surface that is connected to the radially outer surface of the second band member and a radially outer surface that is connected to the radially inner surface of the third band member.

In other features, the first band member, the second band member and the bridge member define a dumbbell-shaped cross-section. In other features, the bridge member includes holes extending in a plane parallel to a direction of compression of the seal by the first body and the second body.

In other features, the seal further includes one or more layers disposed on the first band member, the second band member and the bridge member. In other features, the one or more layers are formed of a different material than the first member, the second member and the bridge member.

In other features, the first member, the second member and the bridge member is formed of a polymer. The at least one of the one or more layers is formed of at least one of aluminum, aluminum oxide, or yttrium oxide.

In other features, the first band member, the second band member and the bridge member are formed of a fluoroelastomer. At least one of the one or more layers is formed of a perfluoroelastomer. In other features, the first band member, the second band member and the bridge member are formed of aluminum. At least one of the one or more layers is formed of a perfluoroelastomer.

In other features, the seal is a spring energized seal. In other features, the first band member includes a first spring element. The second band member includes a second spring element.

In other features, the first band member, the second band member and the bridge member are formed of metal.

In other features, the first band member and the second band member have open circularly-shaped cross-sections. The first band member includes a first inner edge. The second band member includes a second inner edge. When the first band member and the second band member are compressed between the first body and the second body, the first inner edge and the second inner edge move closer to the bridge member.

In other features, a system is provided and includes the seal, the first body, the second body, a pump and a controller. The second body includes a channel. The seal is disposed in the channel. The controller is configured to control the pump to evacuate the cavity, where the cavity is located in the channel between the first band member and the second band member.

In other features, the first body is a housing of a metrology device or a wall of a substrate processing chamber. The second body is the other one of the housing of the metrology device or the wall of the substrate processing chamber. In other features, the first body is a lid or a wall of a substrate processing chamber. The second body is the other one of the lid or the wall of the substrate processing chamber.

In other features, the first body is a component of an assembly or a wall of a substrate processing chamber. The second body is the other one of the component of the assembly or the wall of the substrate processing chamber. The assembly is a species delivery assembly, a transport assembly or a species exhaust assembly.

In other features, a seal to prevent fluid through an interface between a first body and a second body is provided. The seal includes a core and one or more layers disposed on the core. The core is formed of aluminum. The one or more layers are disposed on an outer surface of the core and configured to define a first band seal surface and a second band seal surface when compressed between the first body and the second body, respectively. At least one of the one or more layers is formed of a perfluoroelastomer.

In other features, the core is annular-shaped. In other features, the core is not annular-shaped. In other features, the core is rectangular-shaped with rounded corners.

In other features, at least another one of the one or more layers is formed of at least one of aluminum, aluminum oxide, or yttrium oxide. In other features, the one or more layers include a first layer and a second layer. The first layer is disposed on the core and formed of a first material. The second layer is disposed on the first layer and formed of a second material, where the second material is different than the first material. At least one of the first layer or the second layer is formed of a perfluoroelastomer.

In other features, the one or more layers include a third layer disposed on the second layer and formed of the first material. In other features, a density of each of the one or more layers is 2-5 g/cm$^3$. In other features, a thickness of each of the one or more layers is 20-500 nm.

In other features, the seal is a spring energized seal. In other features, the seal further includes a spring element disposed on the core. The one or more layers are disposed on the spring element.

In other features, a system is provided and includes the seal, the first body, the second body, a pump and a controller. The second body includes a first channel and a second channel. The seal is disposed in the first channel. The seal is a first seal. The system further includes a second seal disposed in the second channel. The controller is configured to control operation of the pump to evacuate fluid from a gap in the interface, where the gap is located between the first body and the second body and between the first seal and the second seal.

In other features, the first channel and the second channel are concentric channels. The second seal is concentric with the first seal. In other features, the first body is a housing of a metrology device or a wall of a substrate processing chamber. The second body is the other one of the housing of the metrology device or the wall of the substrate processing chamber.

In other features, the first body is a lid or a wall of a substrate processing chamber. The second body is the other one of the lid or the wall of the substrate processing chamber.

In other features, the first body is a component of an assembly or a wall of a substrate processing chamber. The second body is the other one of the component of the assembly or the wall of the substrate processing chamber. The assembly is a species delivery assembly, a transport assembly or a species exhaust assembly.

In other features, a seal to prevent fluid through an interface between a first body and a second body is provided. The seal includes a core and one or more layers. The core is formed of a polymer. The one or more layers disposed on the core and configured to define a first band seal surface and a second band seal surface when compressed between the first body and the second body, respectively. At least one of the one or more layers is formed of at least one of aluminum or a perfluoroelastomer.

In other features, the core is annular-shaped. In other features, the core is not annular-shaped. In other features, the core is rectangular-shaped with rounded corners.

In other features, the at least one of the one or more layers is formed of aluminum. In other features, the one or more layers include a perfluoroelastomer. In other features, the one or more layers include aluminum and a perfluoroelastomer.

In other features, the one or more layers include a first layer and a second layer. The first layer is disposed on the core and formed of a first material. The second layer is disposed on the first layer and formed of a second material, where the second material is different than the first material. At least one of the first layer or the second layer is formed of at least one of aluminum or a perfluoroelastomer.

In other features, the one or more layers include a third layer disposed on the second layer and formed of the first material. In other features, a density of each of the one or more layers is 2-5 g/cm$^3$. In other features, a thickness of each of the one or more layers is 20-500 nm.

In other features, the seal is a spring energized seal. In other features, the seal further includes a spring element disposed on the core. The one or more layers are disposed on the spring element.

In other features, a system is provided and includes the seal, the first body, the second body, a pump and a controller. The second body includes a first channel and a second channel. The seal is disposed in the first channel. The second seal is disposed in the second channel. The controller is configured to control operation of the pump to evacuate fluid from a gap in the interface, where the gap is located between the first body and the second body and between the first seal and the second seal.

In other features, the first channel and the second channel are concentric channels. The second seal is concentric with the first seal. In other features, the first body is a housing of a metrology device or a wall of a substrate processing chamber. The second body is the other one of the housing of the metrology device or the wall of the substrate processing chamber.

In other features, the first body is a lid or a wall of a substrate processing chamber. The second body is the other one of the lid or the wall of the substrate processing chamber.

In other features, the first body is a component of an assembly or a wall of a substrate processing chamber. The second body is the other one of the component of the assembly or the wall of the substrate processing chamber. The assembly is a species delivery assembly, a transport assembly or a species exhaust assembly.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A substrate processing system can include various seals. Permeation through and/or leak-by of fluids around these seals can cause substrate degradation and etch, deposition and cleaning performance degradation. Example seals that are used to minimize permeation and leak-by of fluids include metal crush seals (e.g., conflats, c-seals, and vacuum coupling radiation (VCR) gaskets) and paired elastomer O-rings. It is not feasible to use metal crush seals in all locations where seals are used on deposition tools due to space constraints and frequency of making and/or breaking the seals. The size, shape and corrosion resistance of the metal crush seals can also limit and/or prevent use of the metal crush seals in certain locations.

Paired elastomer O-rings include a first O-ring and a second O-ring disposed in respective channels of a first body. The two O-rings provide a dual seal arrangement at an interface between the first body and a second body. The first O-ring is disposed radially outward of and around the second O-ring. An inner diameter of the first O-ring is larger than an outer diameter of the second O-ring such that an interface space exists between the O-rings. Fluid that permeates through and/or leaks by, for example, the first O-ring may be evacuated from the interface space located between the O-rings. This reduces pressure of fluid seen at the second O-ring and reduces risk of fluid permeating through and/or leaking by the second O-ring. Use of paired O-rings however requires integration of two O-ring channels (or grooves) and two different O-rings, which can increase tool costs as compared to integration of a single channel and a single O-ring.

The examples set forth herein include multi-layered single ring seals and multi-ringed seals that reduce permeation rates and/or leak-by rates. The multi-ringed seals may each include two or more ring members and one or more bridge members connecting adjacent ring members. Each of the multi-ringed seals may include a core and one or more layers disposed on the core.

Figure 1:
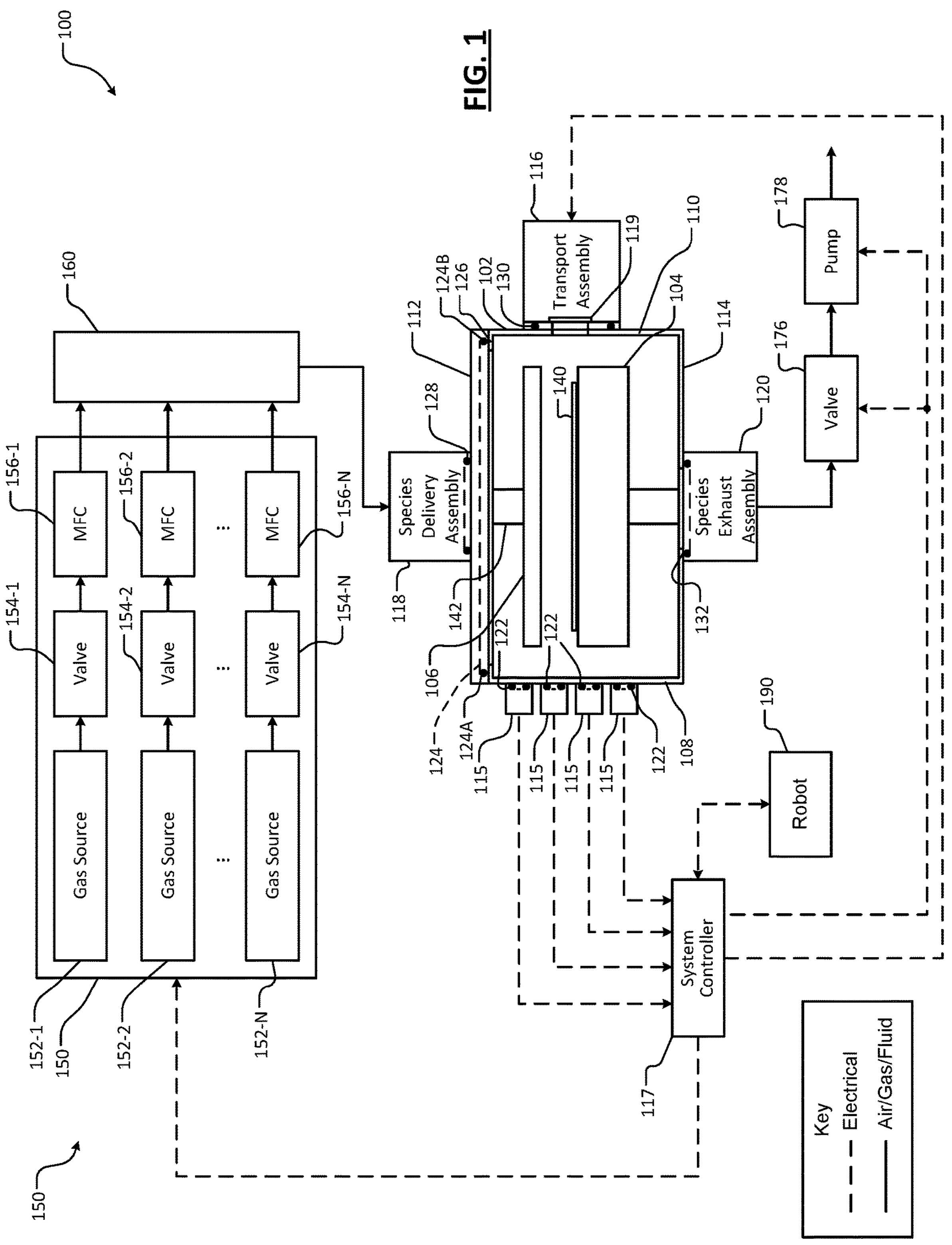
FIG. 1 is a functional block diagram of an example of a substrate processing system incorporating seals in accordance with the present disclosure.

FIG. 1 shows a substrate processing system 100 including a processing chamber 102 with a substrate support 104 (e.g. an electrostatic chuck) and a showerhead 106. The substrate processing system 100 may be implemented as a capacitively coupled plasma (CCP) system. The embodiments disclosed herein are also applicable to transformer coupled plasma (TCP) systems, electron cyclotron resonance (ECR) plasma systems, inductively coupled plasma (ICP) systems and/or other systems and plasma sources that include a substrate support. The embodiments are applicable to substrate processing systems such as atomic layer deposition (ALD), plasma-enhanced ALD (PEALD), physical vapor deposition (PVD) processes, CVD processes, plasma enhanced CVD (PECVD) chemically enhanced plasma vapor deposition (CEPVD) processes, ion implantation processes, plasma etching processes, and/or other etch, deposition, and cleaning processes. The substrate support 104 may be mounted to a bottom of the processing chamber 102. The showerhead 106 is suspended from a top of the processing chamber 102.

The processing chamber 102 includes sidewalls 108, 110, a reactor lid 112, and a bottom wall 114. The reactor lid 112 covers and provides access to an interior of the processing chamber 102 for interior maintenance and service. Various metrology devices 115 may be connected to one or more of the sidewalls 108, 110. The metrology devices may include gas analyzers, cameras, optical emission spectroscopic equipment, temperature sensors, pressure sensors, moisture sensors, pyrometers, etc., which may be monitored by a system controller 117. A transport assembly 116 may also be attached to one of the sidewalls 108, 110 for the transfer of substrates to and from the interior of the processing chamber 102. The transport assembly 116 may include a gate 119 that is opened to allow a substrate to be moved into or removed from the interior of the processing chamber 102. The gate 119 may be pneumatically or electrically actuated. A species delivery assembly 118 may be attached to the reactor lid 112. The species delivery assembly 118 may include one or more injectors, channels, tubes, etc. for supplying processing gas to the interior of the processing chamber 102. A species exhaust assembly 120 may be attached to the bottom wall 114 and used to evacuate the interior of the processing chamber 102.

Seals may be disposed at various locations including at interfaces between (i) the sidewalls 108, 110, the reactor lid 112 and the bottom wall 114, and (ii) the reactor lid 112, the metrology devices 115, transport assembly 116, the species delivery assembly 118 and the species exhaust assembly 120. In the example shown, first seals 122 are disposed between the sidewall 108 and the metrology devices 115. Seals 124, 126, 128, 130 and 132 are also included. Seal 124 is disposed between the reactor lid 112 and a top member 126 of the processing chamber 102. Seal 128 is disposed between the reactor lid 112 and the species delivery assembly 118. Seal 130 is disposed between the sidewall 110 and the transport assembly 116. Seal 132 is disposed between the bottom wall 114 and the species exhaust assembly 120. Although the seals 122, 124, 130, 132 are shown as being in channels of the metrology devices 115, the reactor lid 112, the transport assembly 116 and the species exhaust assembly 120, the seals 122, 124, 130, 132 may be disposed in channels of the walls of the processing chamber 102. Also, although the seals are shown being implemented in certain locations, the examples disclosed herein are applicable to other locations where seals are used.

The seals may prevent, for example, fluids from outside the processing chamber 102 from permeating and/or leaking by and entering the interior of the processing chamber 102. The fluids may include gas (e.g., oxygen) and/or liquid (e.g., water). Other example fluids include air, a coolant, a lubricant, etc. Examples of the seals are shown in FIGS. 2-12 and described below. Each of the seals may be a multi-layer single ringed seal, a multi-ringed seal, or a multi-layer multi-ringed seal. A multi-layer single ringed seal refers to a seal that includes a single ring member that may be annular shaped and has one or more layers formed on a core. As used herein an annular member refers to a member that is ring-shaped. Similarly, an annular bridge member refers to a ring-shaped bridge member. A multi-ringed seal refers to a seal that includes two or more ring members and one or more bridge members, where the one or more bridge members connect the two or more ring members. A multi-layer multi-ringed seal refers to a multi-ringed seal that includes one or more layers formed on a core. Each of the single ringed seals, the multi-ringed seals, and multi-layer multi-ringed seals may have a unitary structure (i.e. single part structure).

The processing chamber 102 encloses multiple components, such as the substrate support 104 and the showerhead 106, and may contain radio frequency (RF) plasma. During operation, a substrate 140 is arranged on the substrate support 104. The showerhead 106 may operate as an upper electrode. Processing gas is introduced via the species delivery assembly, which are distributed via the showerhead 106. The showerhead 106 may include a stem 142 connected to a top surface of the processing chamber 102. The showerhead 106 is generally cylindrical and extends radially outward from an opposite end of the stem 142 at a location that is spaced from the top surface of the processing chamber 102. A substrate-facing surface of the showerhead 106 includes holes through which process or purge gas flows.

A gas delivery system 150 includes one or more gas sources 152-1, 152-2, . . . , and 152-N (collectively gas sources 152), where N is an integer greater than zero. The gas sources 152 supply one or more precursors and gas mixtures thereof. The gas sources 152 may also supply etch gas, carrier gas and/or purge gas. Vaporized precursor may also be used. The gas sources 152 are connected by valves 154-1, 154-2, . . . , and 154-N (collectively valves 154) and mass flow controllers 156-1, 156-2, . . . , and 156-N (collectively mass flow controllers 156) to a manifold 160. An output of the manifold 160 is fed to the species delivery assembly, which may then feed the processing gases to the showerhead 106.

A valve 176 and pump 178 may be used to evacuate reactants from the processing chamber 102 via the species exhaust assembly 120. The system controller 117 may control components of the substrate processing system 100 including controlling pressures and flow rates of supplied gases. The system controller 117 controls states of the valve 176 and the pump 178. A robot 190 may be used to deliver substrates onto and remove substrates from the substrate support 104. For example, the robot 190 may transfer substrates to and from the substrate support 104 via the transport assembly 116 when the gate 119 is in an open state. The system controller 117 may control operation of the transport assembly 116 including the gate 119 and the robot 190.

A portion of the representation of each of the seals 122, 124, 128, 130, 132 in FIG. 1 includes two dots. For example, the seal 124 includes dots 124A and 124B. Different implementations of the seals 122, 124, 128, 130, 132 are shown in FIGS. 2-12. FIGS. 2, 5 and 9A-10B show close-up cross-sectional views for one of these dots for different example implementations. Each of the seals 122, 124, 128, 130, 132 and/or other seals of the substrate processing system 100 may be implemented according to any of the embodiments of FIGS. 2-12. As an example, the seal 124 may include the O-rings of FIG. 2, the multi-ringed seals of FIG. 5 and/or other seals disclosed herein.

Figure 2:
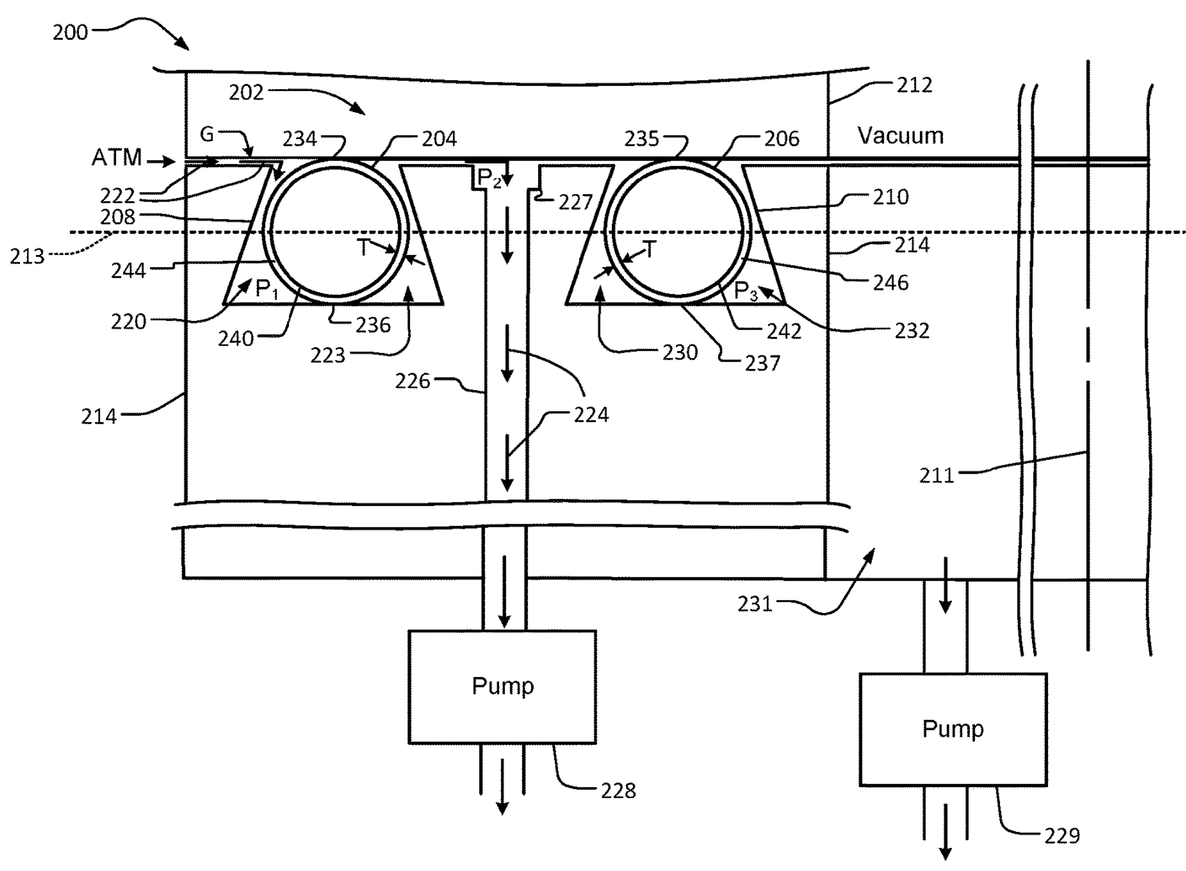
FIG. 2 is a functional block diagram of an example of a sealing system including a cross-sectional view of a portion of an interface having a paired multi-layer O-ring seal in accordance with the present disclosure.
Figure 3:
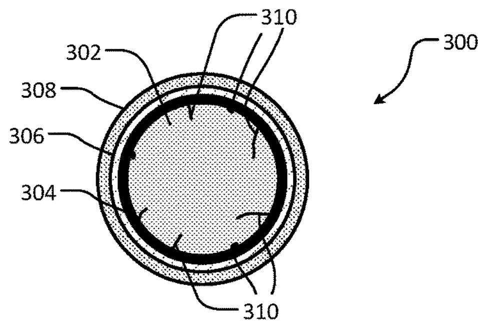
FIG. 3 is a cross-sectional view of an example of a portion of an O-ring in accordance with the present disclosure.

Although the seals of FIGS. 2-12 are primarily described as being ring-shaped and/or including multiple rings (or ring-shaped seals), each of the seals of FIGS. 2-12 may have a different shape. Each of the seals of FIGS. 2-12 may be referred to as a sealing band that includes one or more band members. The band members may include circumferential conforming members, annular members, toroidal-shaped members, circular-shaped members, square-shaped members, square-shaped members with rounded corners, and/or other differently shaped members. Each of the sealing bands may have a circular cross-section as shown in FIG. 3 or a non-circular cross-section.

Figures 4, 5:
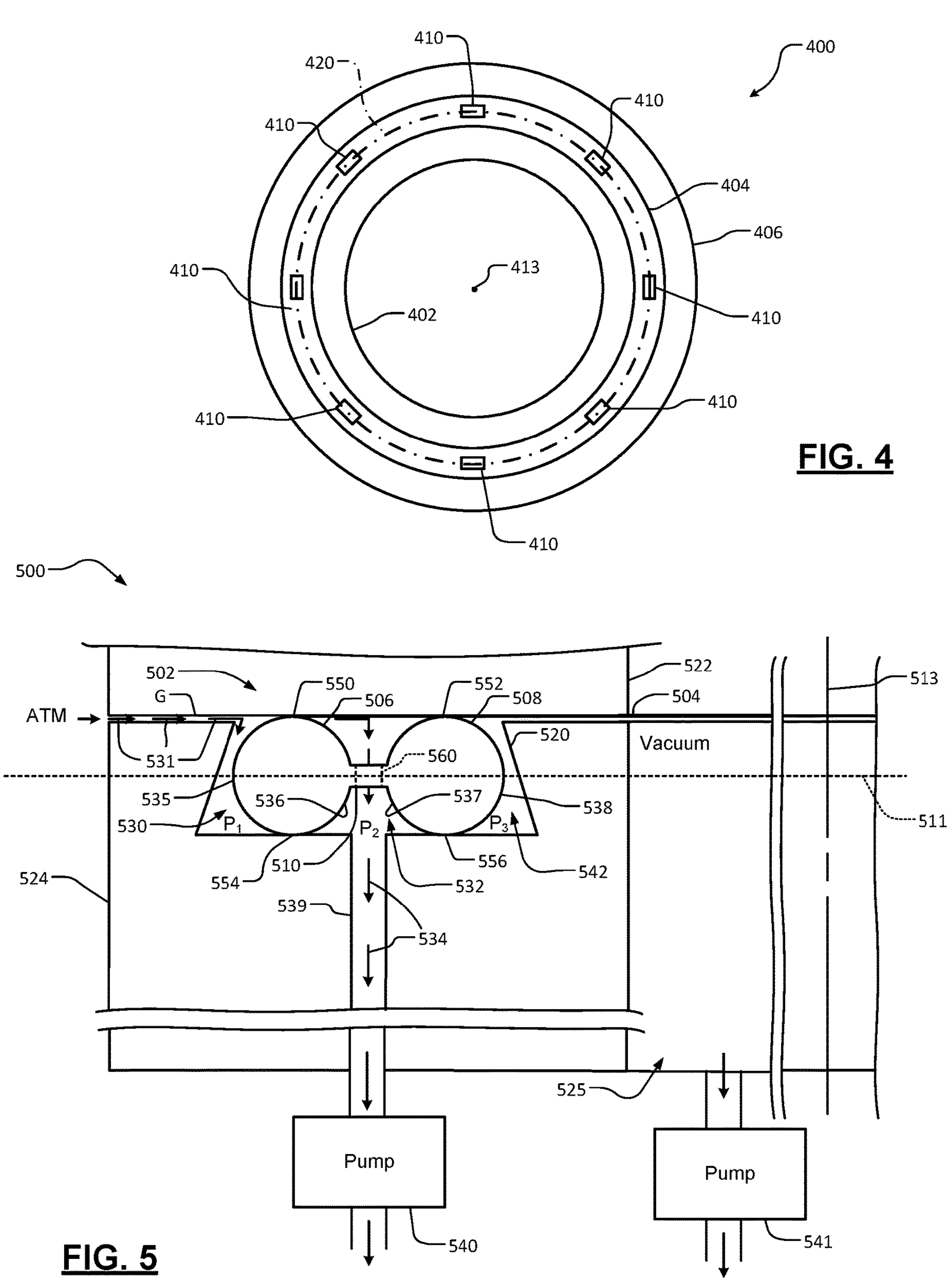
FIG. 4 is a top view of an example of a multi-ringed seal in accordance with the present disclosure.
FIG. 5 is a functional block diagram of an example of a sealing system including a cross-sectional view of a portion of an interface having a dual-ringed seal in accordance with the present disclosure.

Each of the bands may be circular-shaped or have a non-circular and/or irregular shape. A lateral cross-section through each of the bands may be circular, non-circular and/or irregular shaped. An example plane, at which a lateral cross-section of a seal may be taken, is shown in FIG. 5. The plane extends laterally through a center of the seal. A lateral cross-section of the seal of FIG. 5 would appear similar to that shown in FIG. 4. The lateral cross-section is orthogonal to the cross-section of the seal shown in FIG. 5.

In addition, each of the seals has a corresponding sealing gland in which the seal is disposed. Each of the sealing glands refers to portions of bodies providing a cavity in which the seals are disposed. Each of the seals may conform to at least a portion of the corresponding sealing gland. One dimension of each of the sealing glands may be the same or larger than a corresponding dimension of the respective seal. The larger dimension may be provided to ease in installation of the seals and allow for thermal expansion of the seals. A centerline extending through centers of cross-sections of the seals while in application states may or may not follow, be coexistent with, and/or be aligned with a centerline extending though centers of cross-sections of the sealing glands. This may depend on the sizes of the glands relative to the sizes of the seals, placement of the seals in the glands, and whether the seals conform to the glands. An example centerline extending through center points of cross-sections of corresponding portions of a seal is shown in FIG. 4.

FIG. 2 shows a sealing system 200 that includes an interface 202 having a paired multi-layer O-ring seal provided by two O-rings (or bands) 204, 206 disposed in respective channels 208, 210 and between a first interface body 212 and a second interface body 214. The channels 208, 210 are concentric channels and the O-rings 204 and 206 are concentric O-rings, which may be centered on centerline 211. Portions of the bodies 212, 214 that provide cavities for the O-rings 204, 206 are referred to as sealing glands. A reference plane 213 may pass through centers (or centroids) of the 204, 206 and centers of the channels 208, 210. A gap, indicated by arrow G, may exist in the interface between the interface bodies 212, 214. The O-rings 204 and 206 provide two levels of separation between an area outside the interface bodies 212, 214 and an area inside the interface bodies 212, 214. The area outside the interface bodies 212, 214 may be at atmospheric (ATM) pressure. The area inside the interface bodies 212, 214 may be at vacuum.

Ambient air at atmospheric pressure (or a high pressure) may enter a first space 220 on a first side of the first channel 208 as indicated by arrow 222. The pressure $P_1$ in the first space 220 may be at approximately the same or equal to the pressure (or atmospheric pressure) outside the interface bodies 212, 214. A portion of that ambient air may permeate through or leak by the first O-ring 204 and enter a second space 223 on a second side of the first O-ring 204 and may be pumped out, as indicated by arrows 224. The ambient air in the second space 223 may be at a pressure $P_2$ (or intermediate pressure) and may be pumped out via a channel 226 that extends from a plenum 227 below a portion of the interface between the O-rings 204, 206 to a first pump 228. The plenum 227 is included to more uniformly draw ambient air from the portion of the interface between the O-rings 204, 206. A second pump 229 may be used to draw gases from within a chamber 231. The first pump 228 and the second pump 229 may be controlled by the controller 117 of FIG. 1. Pressure $P_3$ (or low pressure) in the third space 232 may be approximately the same as or equal to the pressure in the chamber 231. In one embodiment, the pumps 228, 229 differentially pump the ambient air from the interface between the O-rings 204, 206 and the gases from the chamber 231 to provide a differential in pressure across the O-ring 206. In this embodiment, pressure $P_3$ is lower than the pressure $P_2$. Differential pumping refers to providing different stages of a vacuum system, which includes the pumps 228, 229, to maintain a set difference in pressure between to different regions. Differential pumping may be implemented for other examples disclosed herein, such as that shown in FIGS. 5 and 9A-10B. In another embodiment, the pumps 228, 229 are replaced with a single pump network including a single pump and passive or active restriction devices located upstream from the pump for providing different pressures in the chamber 231 and the portion of the interface between the O-rings 204, 206.

The pressure $P_2$ within a first space 230 of the second channel 210, which is on the first side of the second O-ring 206, is significantly less than the pressure $P_1$ within the first space 220 on the first side of the first O-ring 204. This reduces the probability that fluid permeates through and/or leaks by the second O-ring 206 to a space 232 on a second side of the second O-ring 206. Although a single evacuation port is shown between the channels 208, 210, any number of evacuation ports may be incorporated and draw fluid from the portion of the interface located between the channels 208, 210. The portion of the interface located between the channels 208, 210 may be at the same or a different pressure as in the area inside the interface bodies 212, 214. As an example, the portion of the interface located between the channels 208, 210 may be at a pressure between ATM (or $P_1$) and the pressure $P_3$ in the area inside the interface bodies 212, 214.

The O-rings 204, 206 are annular-shaped (or annular) members that may be pressed between the first interface body 212 and bottoms of the channels 208, 210. The first interface body 212 may be attached to the second interface body 214 via fasteners. As an example, screws may be used to attach the first interface body 212 to the second interface body 214. Top surfaces 234, 235 and bottom surfaces 236, 237 of the O-rings 204, 206 concurrently contact the bodies 212, 214 and are annular-shaped seal surfaces that provide respective fluid seals. This prevents leak-by of fluids passed the O-rings 204, 206. Similar seal arrangements may be provided with seals that are not annular shaped.

In addition, to further prevent permeation and leak-by, each of the O-rings 204, 206 are constructed as disclosed herein and may include a core and one or more layers disposed on the core. In the example shown, the O-rings 204, 206 include respective cores 240, 242 and coatings (or layers) 244, 246. Although the O-rings 204, 206 are shown having a single coating or exterior layer, the O-rings 204, 206 may include any number of layers stacked on the cores 240, 242. The cores 240, 242 and/or the one or more layers are formed of highly dense material (e.g., having density of 2-5 grams per centimeters cubed ($g/cm^3$)) to prevent permeation. In one embodiment, each layer may infuse into and/or fill voids, holes, cracks etc. in the core or an intermediate layer. This further increases density of the O-rings 204, 206 and causes the O-rings 204, 206 to be less permeable. An example of a portion of a layer being infused into another layer is illustrated in FIG. 3.

In one embodiment, the cores 240, 242 of FIG. 2 are formed of an elastomer. In another embodiment, the cores 240, 242 are formed of a non-conductive polymer, such as fluorocarbon (FKM). FKM is a family of fluoroelastomer materials. FKMs include vinylidene fluoride (VDF) and one or more other compounds, such as hexafluoropropylene (HFP), tetrafluoroethylene (TFE), perfluoromethylvinylether (PMVE), propylene and ethylene.

In another embodiment, the cores 240, 242 are formed of aluminum. The one or more layers applied to the cores 240, 242 may be formed of aluminum, a ceramic such as aluminum oxide ($Al_2O_3$), yttrium oxide ($Y_2O_3$), and/or a polymer such as a perfluoroelastomer (FFKM). Fluoroelastomer materials include FFKMs. FFKM provides a good seal for preventing chemical and plasma permeation and leak-by. For this reason, an outermost layer may be formed of a FFKM and a core and/or one or more intermediate layers may be formed of materials that are less resistive to chemical and/or plasma permeation and/or leak-by. As an example, the cores 240, 242 may be formed of aluminum and the coatings 244, 246 may be formed of a FFKM. As an alternative, the one or more layers may be formed of a non-polymer based and/or crystalline based material. As another example, the cores 240, 242 may be formed of an elastomer, an intermediate layer on the cores 240, 242 may be formed of aluminum, and an outermost layer formed on the intermediate layer may be formed of a FFKM.

The one or more layers may be deposited on the cores 240, 242 using atomic layer deposition rather than being adhered to the cores 240, 242. The one or more layers may be applied directly to the cores 240, 242 and/or one or more intermediate layers without intermediate adhesive layers and/or materials being applied.

Although the O-rings are shown as being circular-shaped, similar seals may be formed that are not circular shaped. For example, the seals may have a rectangular cross-section. The dimensions (e.g., diameters) of the cores 240, 242 and the thicknesses of the one or more layers may be adjusted depending on the application. The dimensions and thicknesses may be adjusted to alter the densities of the O-rings 204, 206 and resistances to permeation and leak-by of the O-rings 204, 206. An example thickness T of each of the layers 244, 246 is shown. The one or more layers may be thin, for example, 20-500 nanometers (nm) thick. By having the one or more thin layers, stresses between the layers may be reduced resulting in a structure that is less susceptible to cracking. The one or more layers may be formed of different materials having different chemical compositions and under different pressures and/or temperatures. By having multiple layers having different compositions and/or thicknesses, barrier seal performance and exterior surface finish may be improved.

As an example, the first interface body 212 may be, for example, a housing of a metrology device, a reactor lid, a component of a transport assembly, or a component of a species exhaust assembly. The second interface body 214 may be a wall of a processing chamber. As another example, the first interface body 212 may be a reactor lid and the second interface body 214 may be a component of a species delivery system.

The interface bodies 212, 214 may be formed of the same material or of different materials. One of the interface bodies 212, 214 may be formed of a metallic and/or conductive material and the other one of the interface bodies 212, 214 may be formed of a non-metallic non-conductive material (e.g., ceramic). In another embodiment, the interface bodies 212, 214 are both formed of a metallic and/or conductive material.

FIG. 3 shows an O-ring 300 that includes a core 302, a first intermediate layer 304, a second intermediate layer 306 and an outermost layer 308. The O-ring 300 may replace either or both of the O-rings 204, 206 of FIG. 2. Although the O-ring 300 is shown having three layers on the core 302, any number of layers may be disposed on the core 302. The core 302 may be formed of any of the materials stated above for the cores 240, 242 of FIG. 2. The layers 304, 306, 308 may be formed of any of the materials stated above for the one or more layers disposed on the cores 240, 242. As an example, the core 302 may be formed of a FKM, one or more of the intermediate layers 304, 306 may be formed of aluminum, and the outermost layer 308 may be formed of a FFKM. The layers stacked on the core 302 may alternate between similar composition layers. For example, two layers may be formed of aluminum, $Al_2O_3$, or $Y_2O_3$ and two other layers may be formed of a FFKM, where one of the FFKM layers is disposed between the two layers formed of aluminum, $Al_2O_3$, or $Y_2O_3$ and the other FFKM layer is the outermost layer. Other stacked arrangements may be implemented. The intermediate layer 304 may infuse imperfections in the core 302. Example imperfections 310 are shown.

The following embodiments of FIGS. 4-12 may be implemented to further decrease permeation and/or leak-by rates. The embodiments of FIGS. 4-12 are typically better at preventing permeation and/or leak-by than the embodiments of FIGS. 2-3 depending on the materials, structures, formation of the seals and the applications of the seals. The embodiments of FIGS. 4-12 may be used (i) when there is a high differential in pressures between areas separated by a seal, (ii) when an object (e.g., a substrate) being worked on is sensitive to moisture and/or contaminants, and/or (iii) when a low permeation rate and/or leak-by rate are needed.

FIG. 4 shows a multi-ringed seal (or band) 400 that includes a first inner ring member (or inner band member) 402, a bridge member (or intermediary band member) 404, and an outer ring member (or outer band member) 406. An example implementation of the multi-ringed seal 400 is shown in FIG. 5. Although two ring members and one bridge member is shown, the multi-ringed seal 400 may include N ring members and M bridge members, where N in an integer greater than or equal to 2 and M is equal to N−1. Each of the bridge members connects two adjacent ring members, as shown by the example of FIG. 4, where the bridge member 404 connects the ring members 402, 406. The ring members 402, 406 and the bridge member 404 may be annular shaped. The bridge member 404 may be perforated. In the example shown, the bridge member 404 includes holes 410. The bridge member 404 may include any number of holes having different sizes and shapes. While a rectangular shape is shown, circular elliptical or other shapes may be used. By providing a perforated bridge member, the seal 400 allows fluid above and below the bridge member to be evacuated by drawing the fluid from one side of the bridge member instead of from both sides of the bridge member. An example centerline 420 extending through center points of cross-sections of corresponding portions of the seal 400 is shown in FIG. 4. The centerline 420 follows curvature of the seal 400. The centerline 420 is different than a centerline extending in a direction orthogonal to the line 420 and through a center point 413 of the seal 400.

FIG. 5 shows a sealing system 500 that includes an interface 502 having a multi-ringed seal 504 provided by multiple ring members and one or more bridge members. The multi-ringed seal 504 is a planar seal and may be implemented by the seal 400 of FIG. 4 or by one of the seals of FIGS. 6-8. Although the multi-ringed seal 504 is shown having two ring members 506, 508 and a single bridge member 510, the multi-ringed seal 504 may include N ring members and M bridge members, where N is an integer greater than or equal to 2 and M is an integer equal to N−1. The ring members 506, 508 and bridge member 510 are concentric members and have a dumbbell-shaped cross-section. A reference plane 511 may extend through centers (or centroids) of the ring members 506, 508 and the bridge member 510. The ring members 506, 508 may be centered on a centerline 513.

The multi-ringed seal 504 is disposed in a single channel 520 and between a first interface body 522 and a second interface body 524. The reference plane 511 may also extend through a center of the channel 520. A gap, indicated by arrow G, may exist in the interface between the interface bodies 522, 524. Portions of the bodies 522, 524 that provide a cavity for the seal 504 are referred to as a sealing gland. The ring members 506, 508 provide multiple levels of separation between an area outside the interface bodies 522, 524 and an area inside the interface bodies 522, 524. The area outside the interface bodies 522, 524 may be at ATM (or a high) pressure. The area inside the interface bodies 522, 524 may be under vacuum (or at a low pressure). The centerline 513 may be a center of the interface bodies 522, 524 and/or chamber 525. In one embodiment, the ring members 506, 508 are not centered on a centerline of the interface bodies 522, 524 and/or chamber 525. Similar seal arrangements may be provided with seals that are not annular shaped.

In the example shown, two levels of separation are provided. Ambient air at atmospheric pressure may enter a first space 530 of a first side of the channel 520 as indicated by arrows 531. A portion of that ambient air may permeate through or leak by the first ring member 506 and enter a second space 532 that is between the ring members 506, 508. The ambient air that enters the second space 532 may be pumped out, as indicated by arrows 534. The space 532 is between (i) innermost and outermost surfaces 535, 536 of the first ring member 506, and (ii) innermost and outermost surfaces 537, 538 of the second ring member 508. The ambient air may be pumped out via a channel 539 that extends from the space 532 between the ring members 506, 508 to a pump 540. Pressure $P_2$ within a space (or cavity) 532, which is located between and at least partially defined by the ring members 506 and 508, is significantly less than the pressure $P_1$ in the space 530 on the first side of the first ring member 506. The pressure $P_1$ may be approximately the same as or equal to the pressure in a region outside of the interface bodies 522, 524, which may be at atmospheric pressure. A pressure P3 in space 542 on a second side of the second ring member 508 may be approximately the same as or equal to a pressure within the chamber 525. The chamber 525 may be at vacuum. This reduces the probability that fluid permeates through and/or leaks by the second ring member 508 to the space 542.

A second pump 541 may be used to draw gases from within a chamber 525. The first pump 540 and the second pump 541 may be controlled by the controller 117 of FIG. 1. In one embodiment, the pumps 540, 541 are replaced with a single pump network including a single pump and passive or active restriction devices located upstream from the pump for providing different pressures in the chamber 525 and the portion of the interface between the ring members 506, 508.

The ring members 550, 552 are annular-shaped (or annular) members that may be pressed between the first interface body 522 and a bottom of the channel 520. Top surfaces 550, 552 and bottom surfaces 554, 556 of the ring members 506, 508 concurrently contact the body 522 and the body 524 in the channel 520 and are annular-shaped seal surfaces that provide respective fluid seals. This prevents leak-by of fluids past the ring members 550, 552. The bridge member 510 is an annular member that is spaced away from and does not contact the bodies 522, 524.

The space 532 includes areas above and below the bridge member 510. The bridge member 510 may be perforated and include one or more holes. An example hole 560 is shown. The holes allow the fluid above and below the bridge member 510 to be evacuated via a single evacuation port and/or from a single side of the bridge member 510. Although a single evacuation port is shown below the bridge member 510, any number of evacuation ports may be included above and/or below the bridge member 510.

Figure 6:
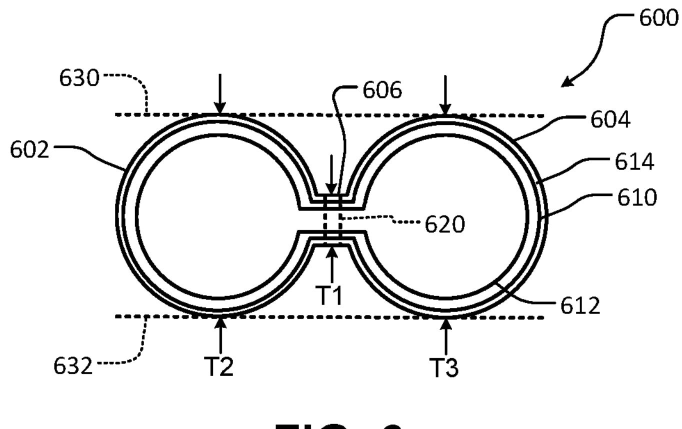
FIG. 6 is a cross-sectional view of an example of a portion of a multi-layer dual-ringed seal having circular-shaped ring member cross-sections in accordance with the present disclosure.
Figure 7:
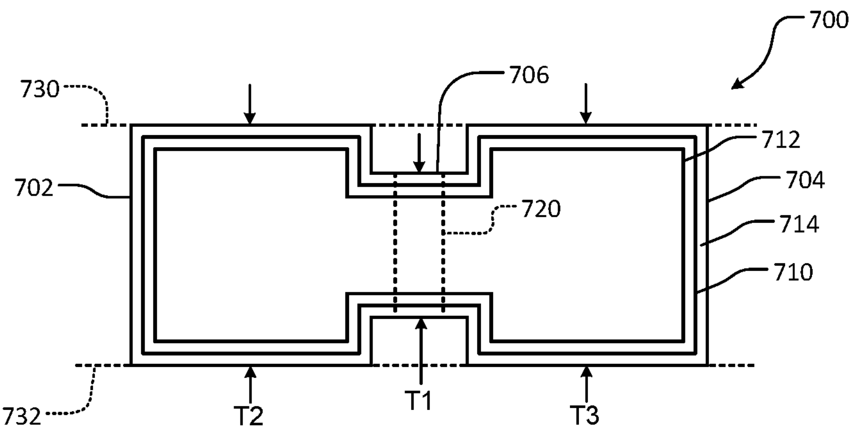
FIG. 7 is a cross-sectional view of an example of a portion of another multi-layer dual-ringed seal having rectangular-shaped ring member cross-sections in accordance with the present disclosure.

In addition, to further prevent permeation and leak-by, the seal 504 is constructed as disclosed herein and may include a core and one or more layers disposed on the core, as shown in FIGS. 6-7. In one embodiment, the seal 504 does not include one or more layers applied to the core. The layers and the core may be formed as further described below.

As an example, the first interface body 522 may be, for example, a housing of a metrology device, a reactor lid, a component of a transport assembly, or a component of a species exhaust assembly. The second interface body 524 may be a wall of a processing chamber. As another example, the first interface body 522 may be a reactor lid and the second interface body 524 may be a component of a species delivery system.

The interface bodies 522, 524 may be formed of the same material or of different materials. One of the interface bodies 522, 524 may be formed of a metallic and/or conductive material and the other one of the interface bodies 522, 524 may be formed of a non-metallic non-conductive material (e.g., ceramic). In another embodiment, the interface bodies 522, 524 are both formed of a metallic and/or conductive material.

FIG. 6 shows a multi-layer dual-ringed seal 600 having circular-shaped ring member cross-sections. The seal 600 includes two ring members 602, 604 and a bridge member 606 that connects the two ring members 602, 604. The ring members 602, 604 and the bridge member 606 have a dumbbell-shaped cross-section. Each of the members 602, 604, 606 may include a core and one or more layers stacked on the core. In the example shown, an intermediate layer 610 is disposed on the core 612 followed by an outermost layer 614, which is disposed on the intermediate layer 610. The core 612 may be a solid unitary structure that includes respective portions of each of the members 602, 604, 606. The bridge member 606 may be perforated and include one or more holes. An example hole 620 is shown. The bridge member 606 may be equally spaced between parallel planes 630, 632 that extend across and tangentially pass through first (e.g., uppermost) points and second (e.g., lowermost) points of the ring members 602, 604.

Although the seal 600 is shown having two layers applied to a core, the seal 600 may have any number of layers. In one embodiment, the layers 610, 614 are thin coating layers. Each of the layers 610, 614 may have a thickness of 20-500 nm. The dimensions of the core 612 and the thicknesses of the one or more layers may be adjusted depending on the application. The dimensions and the thicknesses may be adjusted to alter the densities of the ring members 602, 604 and resistances to permeation and leak-by of the ring members 602, 604. By including one or more thin layers, stresses between the layers may be reduced and as a result the structure of the seal 600 is less susceptible to cracking. Although the bridge member 606 is shown having particular dimensions (e.g., thickness T1), the dimensions of the bridge member 606 may be different than shown. Also, although the dimensions (e.g., the thicknesses T2, T3) of the ring members 602, 604 are shown as being equal in size, the dimensions may not be equal in size.

The core 612 and/or the one or more layers on the core 612 may be formed of highly dense material (e.g., having density of 2-5 g/cm$^3$) to prevent permeation. In one embodiment, each layer may be infused into and/or fill voids, holes, cracks etc. in the core 612 or an intermediate layer, which further increases density and causes the seal 600 to be less permeable.

In one embodiment, the core 612 is formed of an elastomer. In another embodiment, the core 612 is formed of a non-conductive polymer, such as FKM. In another embodiment, the core 612 is formed of aluminum. The one or more layers applied to the core 612 may be formed of aluminum, a ceramic such as $Al_2O_3$, $Y_2O_3$, and/or a polymer such as FFKM. In an embodiment, an outermost layer may be formed of a FFKM, which is highly resistive to chemical and plasma permeation and leak-by, and the core 612 and/or one or more intermediate layers may be formed of materials that are less resistive to chemical and/or plasma permeation and/or leak-by. As an example, the core 612 may be formed of aluminum and the one or more layers may be formed of a FFKM. As an alternative, the one or more layers may be formed of a highly dense non-polymer based and/or crystalline based material.

As another example, the core 612 may be formed of an elastomer, an intermediate layer on the core 612 may be formed of aluminum, and an outermost layer formed on the intermediate layer may be formed of a FFKM. The one or more layers may be deposited on the core 612 using atomic layer deposition rather than being adhered to the core 612. The one or more layers may be applied directly to the core 612 and/or one or more intermediate layers without intermediate adhesive layers and/or materials being applied. The one or more layers may be formed of different materials having different chemical compositions and under different pressures and/or temperatures. By having multiple layers having different compositions and/or thicknesses, barrier seal performance is improved.

FIG. 7 shows a multi-layer dual-ringed seal 700 having rectangular-shaped ring member cross-sections. The seal 700 is another example of a dual-ringed seal having different geometry than the above-described seals. The seal 700 includes two ring members 702, 704 and a bridge member 706 that connects the two ring members 702, 704. Although the ring members 702, 704 are shown as being rectangular shaped, the ring members 702, 704 may be square shaped. Each of the members 702, 704, 706 may include a core and one or more layers stacked on the core. In the example shown, an intermediate layer 710 is disposed on the core 712 followed by an outermost layer 714, which is disposed on the intermediate layer 710. The core 712 may be a solid unitary structure that includes respective portions of each of the members 702, 704, 706. The bridge member 706 may be perforated and include one or more holes. An example hole 720 is shown. The bridge member 706 may be equally spaced between parallel planes 730, 732 that extend across and tangentially pass through uppermost points and lowermost points of the ring members 702, 704.

Although the seal 700 is shown having two layers applied to a core, the seal 700 may have any number of layers. In one embodiment, the layers 710, 714 are thin coating layers. Each of the layers 710, 714 may have a thickness of 20-500 nm. The dimensions of the core 712 and the thicknesses of the one or more layers may be adjusted depending on the application. The dimensions and thicknesses may be adjusted to alter the densities of the ring members 702, 704 and resistances to permeation and leak-by of the ring members 702, 704. By including one or more thin layers, stresses between the layers may be reduced and the structure of the seal 700 is as a result less susceptible to cracking. Although the bridge member 706 is shown having particular dimensions (e.g., thickness T1), the dimensions of the bridge member 706 may be different than shown. Also, although the dimensions (e.g., thicknesses T2, T3) of the ring members 702, 704 are shown as being equally sized, the dimensions of the ring members 702, 704 may be different.

The core 712 and/or the one or more layers on the core 712 may be formed of highly dense material (e.g., having density of 2-5 $g/cm^3$) to prevent permeation. In one embodiment, each layer may be infused into and/or fill voids, holes, cracks etc. in the core 712 or an intermediate layer, which further increases density and causes the seal 700 to be less permeable.

In one embodiment, the core 712 is formed of an elastomer. In another embodiment, the core 712 is formed of a non-conductive polymer, such as FKM. In another embodiment, the core 712 is formed of aluminum. The one or more layers applied to the core 712 may be formed of aluminum, a ceramic such as $Al_2O_3$, $Y_2O_3$, and/or a polymer such as FFKM. In an embodiment, an outermost layer may be formed of a FFKM and the core 712 and/or one or more intermediate layers may be formed of materials that are less resistive to chemical and/or plasma permeation and/or leak-by. As an example, the core 712 may be formed of aluminum and the one or more layers may be formed of a FFKM. As an alternative, the one or more layers may be formed of a non-polymer based and/or crystalline based material.

As another example, the core 712 may be formed of an elastomer, an intermediate layer on the core 712 may be formed of aluminum, and an outermost layer formed on the intermediate layer may be formed of a FFKM. The one or more layers may be deposited on the core 712 using atomic layer deposition rather than being adhered to the core 712. The one or more layers may be applied directly to the core 712 and/or one or more intermediate layers without intermediate adhesive layers and/or materials being applied. The one or more layers may be formed of different materials having different chemical compositions and under different pressures and/or temperatures. By having multiple layers having different compositions and/or thicknesses, barrier seal performance is improved.

Figure 8:
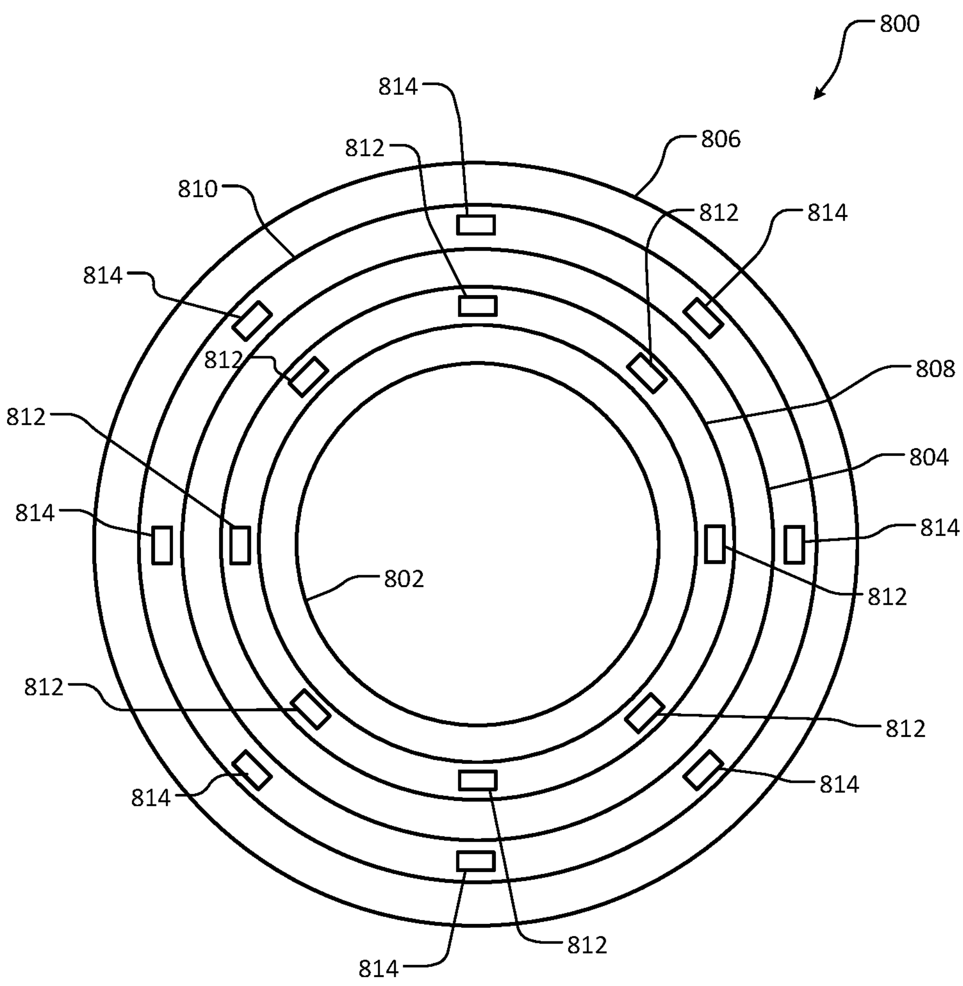
FIG. 8 is a top view of another example of a multi-ringed seal including multiple bridge members in accordance with the present disclosure.

Although the seals of FIGS. 5-7 are shown as having two ring members and a single bridge member, the seals may have additional ring members and bridge members. An example of which is shown in FIG. 8. FIG. 8 shows a multi-ringed seal 800 including three ring members 802, 804, 806 and two bridge members 808, 810. The seal 800 may be implemented in a channel similar to the channel 520 shown in FIG. 5. The seal 800 provides three levels of separation between areas external to the seal. Although three ring members and two bridge member are shown, the seal 800 may include a different number of ring members and bridge members. Each of the bridge members connects two adjacent ring members. For example, the bridge member 808 connects the ring members 802, 804 and the bridge member 810 connects the ring members 804, 806. The members 802, 804, 806, 808, 810 may be annular shaped. The bridge members 808, 810 may be perforated. In the example shown, the bridge member 808 includes holes 812 and the bridge member 810 includes holes 814. The bridge members 808, 810 may include any number of holes having different sizes and shapes. By providing perforated bridge members 808, 810, the seal 800 allows fluid above and below the bridge members 808, 810 to be evacuated by drawing the fluid from one side of the bridge members 808, 810 instead of from both sides of the bridge members 808, 810.

The areas above and below the bridge members 808, 810 may be evacuated via respective channels and one or more pumps, similar to the areas above and below the bridge member 510 of FIG. 5. The differential pressures across each of the ring members 802, 804, 806 is different. As an example, a pressure drop across the ring member 806 may be from ATM to 60 milli-Torr (mT). A pressure drop across the ring member 804 may be from 60 mT to 1 mTorr. A pressure drop across the ring member 802 may be from 1 mT to 1 micro-Torr (μT). These pressures are provided as examples, the pressures may be different and the pressure differentials across the ring members 802, 804, 806 may be different.

Figure 9A:
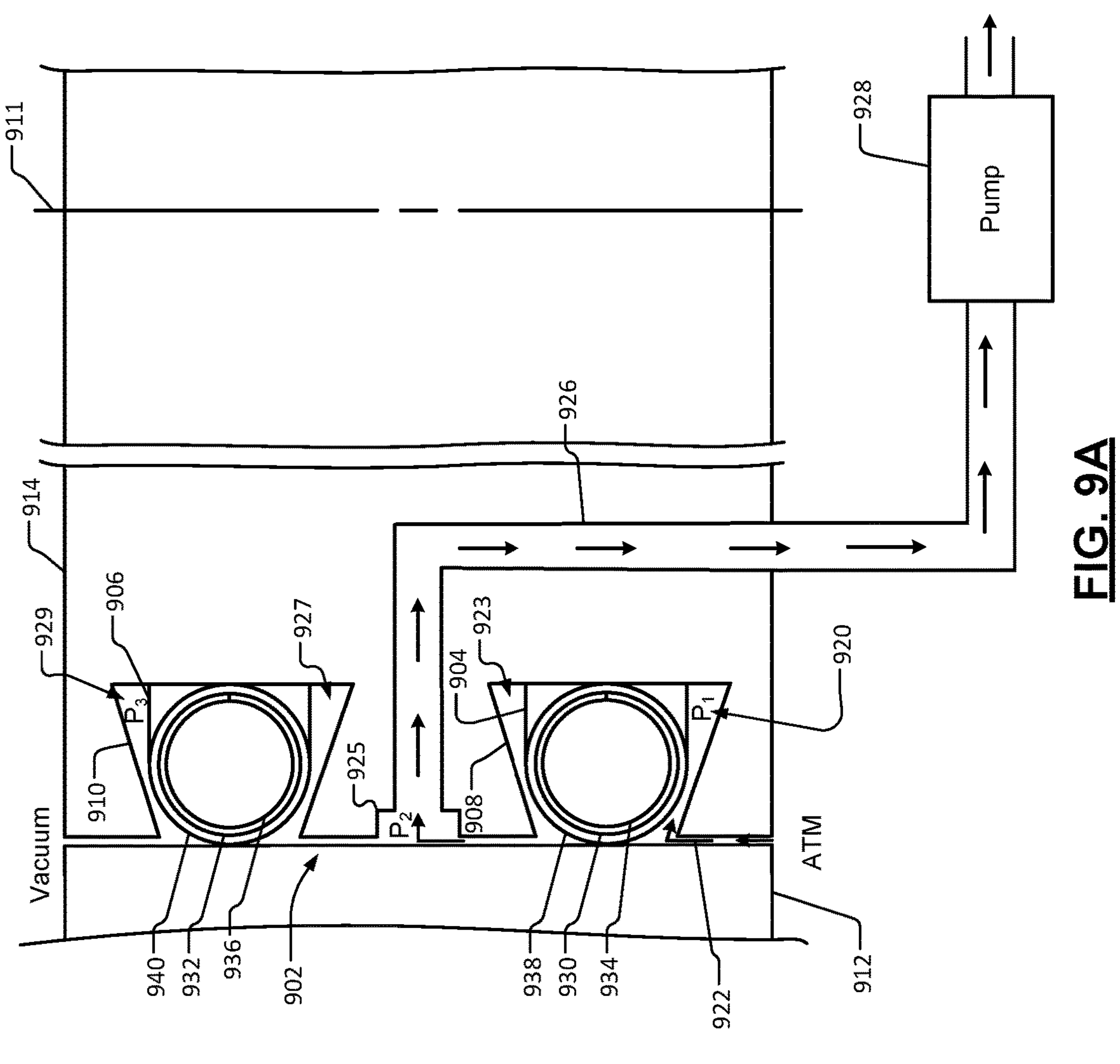
FIG. 9A is a functional block diagram of an example of a sealing system including a cross-sectional view of a portion of an interface having a paired multi-layer seal in a vertical arrangement and disposed around an interface body and in channels of the interface body in accordance with the present disclosure.

FIG. 9A shows a sealing system 900 that is similar to the sealing system 200 of FIG. 2, but includes annular seals arranged vertically between regions of different pressures. The sealing system 900 includes an interface 902 having a paired multi-layer O-ring seal provided by two O-rings (or bands) 904, 906 disposed in respective channels 908, 910 and between a first interface body 912 and a second interface body 914. Portions of the bodies 912, 914 that provide cavities for the O-rings 904, 906 are referred to as sealing glands. The channels 908, 910 are vertically arranged, where the channel 908 is disposed above the channel 910. The channels may be the same size and centered on a same center axis 911. Similarly, the O-rings 904 and 906 are vertically arranged, where the O-ring 904 is disposed in the first channel 908 above the second O-ring 906, which is disposed in the second channel 908. The O-rings 904, 906 may be centered on the same center axis 911 as the channels 908, 910.

The O-rings 904 and 906 provide two levels of separation between regions above and below (or outside) the interface bodies 912, 914. A first region shown as below the interface bodies 912, 914 may be at atmospheric (ATM) pressure. A second region shown above the interface bodies 912, 914 may be at vacuum. The O-rings 904, 906 wrap around the interface body 914 and may be formed similarly as the O-rings 204, 206 of FIG. 2 and may include one or more layers, as described above.

Ambient air at atmospheric pressure may enter a first space 920 on a first side of the first channel 908 as indicated by arrow 922. A pressure $P_1$ of the first space 920 may be approximately the same or equal to atmospheric pressure. A portion of that ambient air may permeate through or leak by the first O-ring 904 and enter a second space 923 on a second side of the first O-ring 904 and may be pumped out, as indicated by arrows 924. The ambient air may be pumped out via a channel 926 that extends from a plenum 925 on one side of a portion of the interface between the O-rings 904, 906 to a pump 928. The pump 928 may be controlled by the controller 117 of FIG. 1. The plenum 925 may be at a second pressure $P_2$ and is included to more uniformly draw ambient air from the portion of the interface between the O-rings 904, 906. The pressure $P_2$ is less than the pressure $P_1$. Ambient air in a first space 927 on a first side of the second O-ring 906 may be at the pressure $P_2$. Pressure $P_3$ of the gases in a second space 929 on a second side of the second O-ring 906 may be approximately the same or equal to the pressure (or at vacuum) above the interface bodies 912, 914. Pressure $P_3$ may be less than or equal to pressure $P_2$.

The interface bodies 912, 914 may be formed of the same material or of different materials. One of the interface bodies 912, 914 may be formed of a metallic and/or conductive material and the other one of the interface bodies 912, 914 may be formed of a non-metallic non-conductive material (e.g., ceramic). In another embodiment, the interface bodies 912, 914 are both formed of a metallic and/or conductive material.

Any of the seals disclosed herein may be spring-energized seals including the seals of FIGS. 2 and 5-7. As an example, the O-rings 904, 906 may include respective annular-shaped spring elements 930 and 932. The spring-energized seals referred to herein include spring elements to provide increased and consistent load and sealing throughout the circumferences of the seals. The O-rings of FIG. 2 may be similarly formed to include annular-shaped spring elements.

Referring again to FIG. 9A, the spring elements 930 and 932 may include helical springs, canted coil springs, cantilever springs, spiral springs and/or other types of engineering compliance elements. The seals may be O-ring energized seals, extended heal cantilevers seals, extended heal canted seals, extended heel helical seals, flanged seals, O-ring heel seals, O-ring outer diameter (OD) seals, internal face seals, external face seals, etc. The spring elements 930, 932 may be disposed over cores 934, 936. One or more layers 938 and one or more layers 940 may be formed respectively over the spring elements 930, 932. In one embodiment, the O-rings 904, 906 do not include spring elements. In another embodiment, the cores 934, 936 are not included. The one or more layers 938 and the one or more layers 940 may include any of the materials referred to above for cores and/or layers.

In yet another embodiment, two or more layers are formed over the spring elements 930, 932 similar to the multiple layers described above for FIGS. 6-7. In one embodiment, first layers are formed over the spring elements 930, 932 and are formed of an elastomer. In another embodiment, the first layers are formed of a non-conductive polymer, such as FKM. In another embodiment, the first layers are formed of aluminum. One or more layers may then be applied to the first layers and be formed of aluminum, a ceramic such as $Al_2O_3$, $Y_2O_3$, and/or a polymer such as FFKM.

Figure 9B:
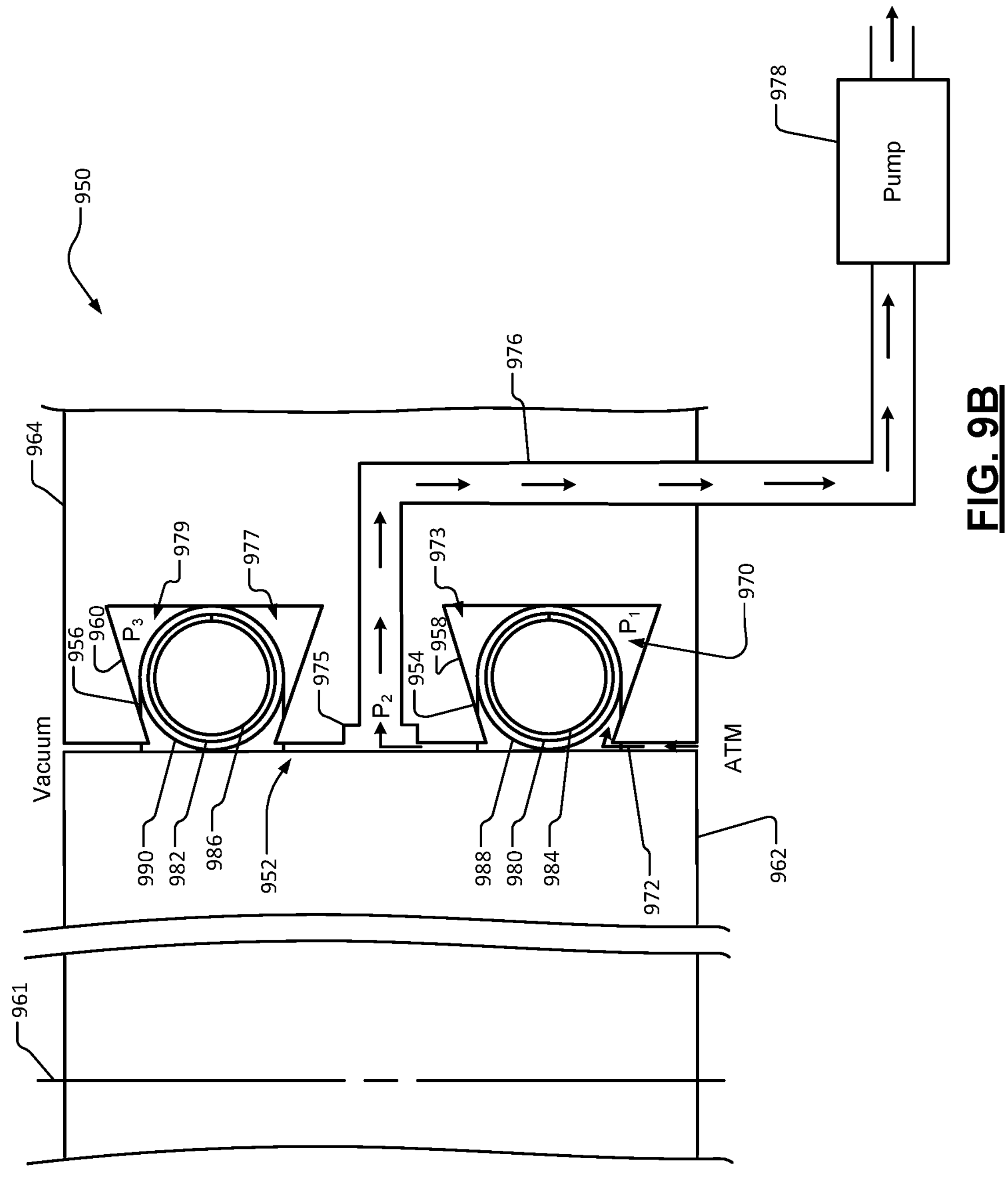
FIG. 9B is a functional block diagram of an example of a sealing system including a cross-sectional view of a portion of an interface having a paired multi-layer seal in a vertical arrangement and disposed around a first interface body and in channels of a second interface body in accordance with the present disclosure.

FIG. 9B shows a sealing system 950 that is similar to the sealing system 900 of FIG. 9A, but includes annular seals arranged around a cylindrically-shaped interface body while being disposed in channels of another interface body. The sealing system 950 includes an interface 952 having a paired multi-layer O-ring seal provided by two 954, 956 disposed in respective channels 958, 960 of the interface body 964 and between a first interface body 962 and a second interface body 964. The channels 958, 960 are vertically arranged, where the channel 958 is disposed above the channel 960. The channels 958, 960 may be the same size and centered on a same center axis 961. Similarly, the O-rings 954 and 956 are vertically arranged, where the O-ring 954 is disposed in the first channel 958 above the second O-ring 956, which is disposed in the second channel 958. The O-rings 954, 956 may be centered on the same center axis 961 as the channels 958, 960.

The O-rings 954 and 956 provide two levels of separation between regions above and below (or outside) the interface bodies 962, 964. A first region shown as below the interface bodies 962, 964 may be at atmospheric pressure. A second region shown above the interface bodies 962, 964 may be at vacuum. The O-rings 954, 956 wrap around the interface body 962 and may be formed similarly as the O-rings 204, 206 of FIG. 2 and may include one or more layers, as described above.

Ambient air at atmospheric pressure may enter a first space 970 on a first side of the first channel 958 as indicated by arrow 972. A pressure $P_1$ of the first space 970 may be approximately the same or equal to atmospheric pressure. A portion of that ambient air may permeate through or leak by the first O-ring 954 and enter a second space 973 on a second side of the first O-ring 954 and may be pumped out, as indicated by arrows 924. The second space 973 may be at a second pressure $P_2$ that is less than the pressure $P_1$. The ambient air may be pumped out via a channel 976 that extends from a plenum 975 on one side of a portion of the interface between the O-rings 954, 956 to a pump 978. The pump 978 may be controlled by the controller 117 of FIG. 1. The plenum 975 is at the second pressure $P_2$ and is included to more uniformly draw ambient air from the portion of the interface between the O-rings 954, 956.

Ambient air in a first space 977 on a first side of the second O-ring 956 may be at the pressure $P_2$. Pressure $P_3$ of the gases in a second space 979 on a second side of the second O-ring 956 may be approximately the same or equal to the pressure (or at vacuum) above the interface bodies 962, 964. Pressure $P_3$ may be less than or equal to pressure $P_2$.

The interface bodies 912, 914 may be formed of the same material or of different materials. One of the interface bodies 912, 914 may be formed of a metallic and/or conductive material and the other one of the interface bodies 912, 914 may be formed of a non-metallic non-conductive material (e.g., ceramic). In another embodiment, the interface bodies 912, 914 are both formed of a metallic and/or conductive material.

As an example, the O-rings 954, 956 may include respective annular-shaped spring elements 980 and 982. The spring elements 980 and 982 may include helical springs, canted coil springs, cantilever springs, spiral springs and/or other types of spring elements. The seals may be O-ring energized seals, extended heal cantilevers seals, extended heal canted seals, extended heel helical seals, flanged seals, O-ring heel seals, O-ring outer diameter (OD) seals, internal face seals, external face seals, etc. The spring elements 980, 982 may be disposed over cores 984, 986. One or more layers 988 and one or more layers 990 may be formed respectively over the spring elements 980, 982. In one embodiment, the O-rings 954, 956 do not include spring elements. In another embodiment, the cores 984, 986 are not included. The one or more layers 988 and the one or more layers 990 may include any of the materials referred to above for cores and/or layers.

In yet another embodiment, two or more layers are formed over the spring elements 980, 982 similar to the multiple layers described above for FIGS. 6-7. In one embodiment, first layers are formed over the spring elements 980, 982 and are formed of an elastomer. In another embodiment, the first layers are formed of a non-conductive polymer, such as FKM. In another embodiment, the first layers are formed of aluminum. One or more layers may then be applied to the first layers and be formed of aluminum, a ceramic such as $Al_2O_3$, $Y_2O_3$, and/or a polymer such as FFKM.

Figure 10A:
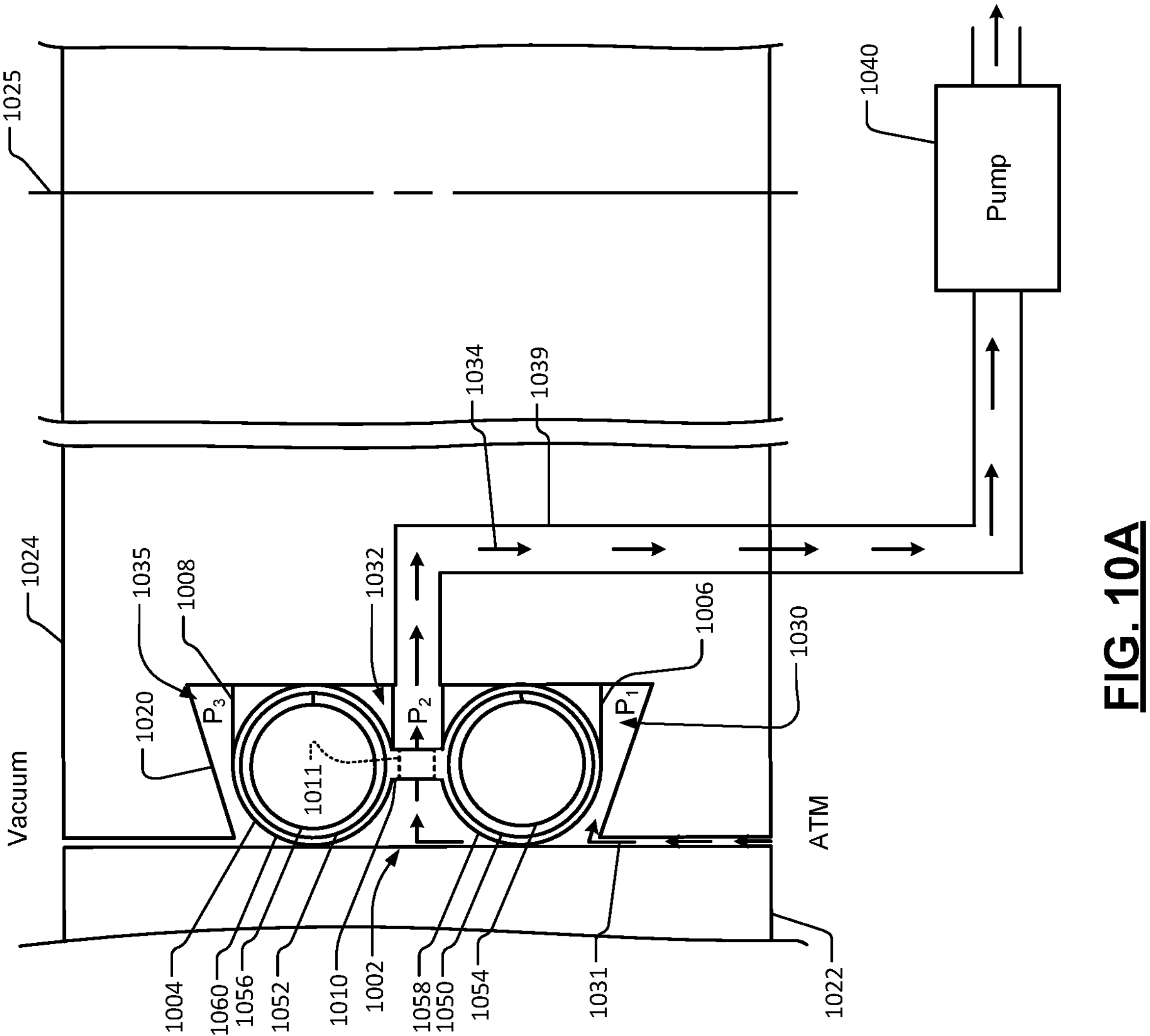
FIG. 10A is a functional block diagram of an example of a sealing system including a cross-sectional view of a portion of an interface having a dual-ringed seal in a vertical arrangement and disposed around an interface body and in a channel of the interface body in accordance with the present disclosure.

FIG. 10A shows a sealing system 1000 that includes an interface 1002 having a multi-ringed seal (or member) 1004 provided by multiple ring members (or band members) 1006, 1008 and one or more bridge members (or one or more band members) 1010. The multi-ringed seal 1004 is a cylindrical seal. Although the multi-ringed seal 1004 is shown having two ring members and a single bridge member, the multi-ringed seal 1004 may include N ring members and M bridge members, where N is an integer greater than or equal to 2 and M is an integer equal to N−1. The ring members 1006, 1008 and bridge member 1010 are vertically arranged members and have a dumbbell-shaped cross-section. The bridge member 1010 includes holes (one hole 1011 is shown). The members 1006, 1008, 1010 are arranged in a stack. Any number of additional ring members and bridge members may added to the stack. The multi-ringed seal 1004 may be formed similarly as the multi-ringed seals of FIGS. 4-8 and may include one or more layers, as described above.

The multi-ringed seal 1004 is disposed in a single channel 1020 and between a first interface body 1022 and a second interface body 1024. Portions of the bodies 1012, 1014 that provide a cavity for the seal 1004 is referred to as a sealing gland. The second interface body 1024 may be cylindrical in shape and the multi-ringed seal 1004 may extend around the second interface body 1024. The first interface body 1022 may surround the multi-ringed seal 1004. The ring members 1006, 1008 provide multiple levels of separation between regions above and below (or outside) the interface bodies 1022, 1024. The region below the interface bodies 1022, 1024 may be at ATM pressure. The region above the interface bodies 1022, 1024 may be under vacuum. The members 1006, 1008, 1010 and the channel 1020 may be centered on the same center axis 1025. The seal 1004 may be centered on the centerline 1025, which may be a centerline of the interface body 1024.

In the example shown, two levels of separation are provided. Ambient air at atmospheric pressure may enter a first space 1030 of a first side of the channel 1020 as indicated by arrows 1031. Pressure $P_1$ in the first space 1030 may be approximately the same or equal to atmospheric pressure (or first high pressure), A portion of that ambient air may permeate through or leak by the first ring member 1006 and enter a second space 1032 that is between the ring members 1006, 1008. Pressure $P_2$ in the second space 1032 is an intermediate pressure. The ambient air that enters the second space (or cavity) 1032 may be pumped out, as indicated by arrows 1034. The ambient air may be pumped out via a channel 1039 that extends from the space 1032 between the ring members 1006, 1008 to a pump 1040, which may be controlled by the controller 117 of FIG. 1. A third space 1035 on a second side of the channel 1020 may be at a low pressure $P_3$, which may be the same or less than the pressure $P_2$.

The interface bodies 1022, 1024 may be formed of the same material or of different materials. One of the interface bodies 1022, 1024 may be formed of a metallic and/or conductive material and the other one of the interface bodies 1022, 1024 may be formed of a non-metallic non-conductive material (e.g., ceramic). In another embodiment, the interface bodies 1022, 1024 are both formed of a metallic and/or conductive material.

The ring members 1006, 1008 may include respective annular-shaped spring elements 1050 and 1052. The ring members of FIG. 5 may be similarly formed to include annular-shaped spring elements. Referring again to FIG. 10A, the spring elements 1050 and 1052 may include helical springs, canted coil springs, cantilever springs, spiral springs and/or other types of spring elements. The seals may be extended heal cantilevers seals, extended heal canted seals, extended heel helical seals, flanged seals, internal face seals, external face seals, etc. The spring elements 1050 and 1052 may be disposed over cores 1054, 1056. One or more layers 1058 and one or more layers 1060 may be formed over the spring elements 1050, 1052. The one or more layers 1058 and the one or more layers 1060 may be integrally formed, include the bridge member 1010 and be formed of any of the materials referred to above for cores and/or layers. In one embodiment, the ring members 1006, 1008 do not include spring elements. In another embodiment, the cores 1054, 1056 are not included.

In yet another embodiment, two or more layers are formed over the spring elements 1050, 1052, similar to the multiple layers described above for FIGS. 6-7. In one embodiment, a first layer is formed over the spring elements 1050, 1052 and is formed of an elastomer. In another embodiment, the first layer is formed of a non-conductive polymer, such as FKM. In another embodiment, the first layer is formed of aluminum. One or more layers may then be applied to the first layer and be formed of aluminum, a ceramic such as $Al_2O_3$, $Y_2O_3$, and/or a polymer such as FFKM.

Figure 10B:
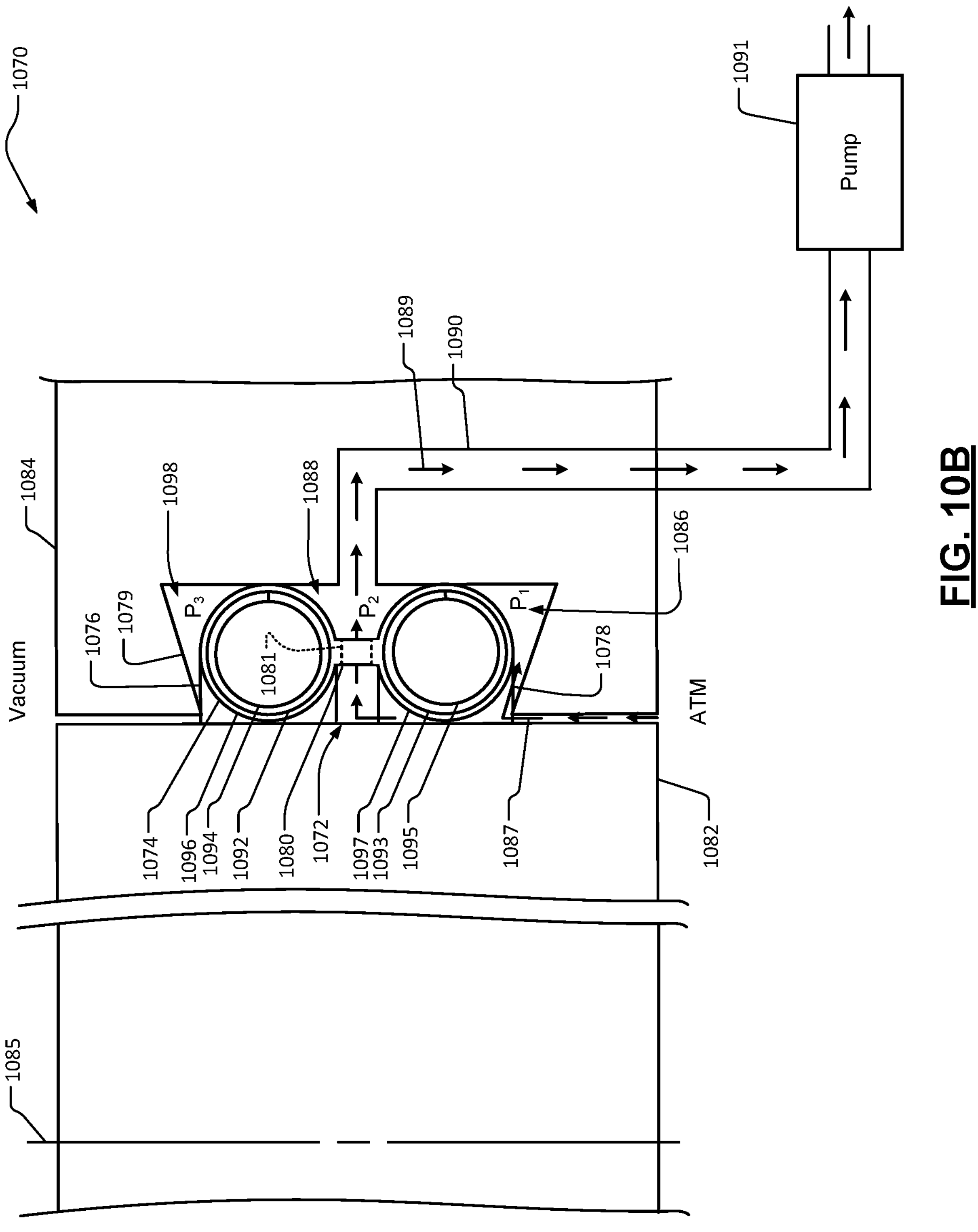
FIG. 10B is a functional block diagram of an example of a sealing system including a cross-sectional view of a portion of an interface having a dual-ringed seal in a vertical arrangement and disposed around a first interface body and in a channel of a second interface body in accordance with the present disclosure.

FIG. 10B shows a sealing system 1070 that includes an interface 1072 having a multi-ringed seal 1074 provided by multiple ring members 1076, 1078 and one or more bridge members 1080. The multi-ringed seal 1074 is a cylindrical seal. Although the multi-ringed seal 1074 is shown having two ring members and a single bridge member, the multi-ringed seal 1074 may include N ring members and M bridge members, where N is an integer greater than or equal to 2 and M is an integer equal to N−1. The ring members 1076, 1078 and bridge member 1080 are vertically arranged members and have a dumbbell-shaped cross-section. The bridge member 1080 includes holes (one hole 1081 is shown). The members 1076, 1078, 1080 are arranged in a stack. Any number of additional ring members and bridge members may added to the stack. The multi-ringed seal 1074 may be formed similarly as the multi-ringed seals of FIGS. 4-8 and may include one or more layers, as described above.

The multi-ringed seal 1074 is disposed in a single channel 1079 and between a first interface body 1082 and a second interface body 1084. The first interface body 1082 may be cylindrical in shape and the multi-ringed seal 1074 may extend around the first interface body 1082. The first interface body 1082 may surround the multi-ringed seal 1004. The ring members 1076, 1078 provide multiple levels of separation between regions above and below (or outside) the interface bodies 1082, 1084. The region below the interface bodies 1082, 1084 may be at ATM pressure (or a high pressure). The region above the interface bodies 1082, 1084 may be under vacuum (or at a low intermediate pressure). The members 1076, 1078, 1080 and the channel 1079 may be centered on the same center axis 1085. The seal 1074 may be centered on the centerline 1085, which may be a centerline of the interface body 1082.

In the example shown, two levels of separation are provided. Ambient air at atmospheric pressure may enter a first space 1086 of a first side of the channel 1079 as indicated by arrows 1087. Pressure $P_1$ in the first space 1086 may be approximately the same or equal to the atmospheric pressure (or low pressure). A portion of that ambient air may permeate through or leak by the first ring member 1076 and enter a second space 1088 that is between the ring members 1076, 1078. Pressure $P_2$ in the second space 1032 may be at an intermediate pressure. The ambient air that enters the second space (or cavity) 1032 may be pumped out, as indicated by arrows 1089. The ambient air may be pumped out via a channel 1090 that extends from the space 1088 between the ring members 1076, 1078 to a pump 1091, which may be controlled by the controller 117 of FIG. 1. A third space 1098 on a second side of the channel 1079 may be at a low pressure $P_3$, which may be approximately the same or equal to the pressure above the interface bodies 1082, 1084.

The interface bodies 1082, 1084 may be formed of the same material or of different materials. One of the interface bodies 1082, 1084 may be formed of a metallic and/or conductive material and the other one of the interface bodies 1082, 1084 may be formed of a non-metallic non-conductive material (e.g., ceramic). In another embodiment, the interface bodies 1082, 1084 are both formed of a metallic and/or conductive material.

The ring members 1076, 1078 may include respective annular-shaped spring elements 1092 and 1093. The spring elements 1092 and 1093 may include helical springs, canted coil springs, cantilever springs, spiral springs and/or other types of spring elements. The seals may be extended heal cantilevers seals, extended heal canted seals, extended heel helical seals, flanged seals, internal face seals, external face seals, etc. The spring elements 1092 and 1093 may be disposed over cores 1094, 1095. One or more layers 1096 and one or more layers 1097 may be formed over the spring elements 1092, 1093. The one or more layers 1096 and the one or more layers 1097 may be integrally formed, include the bridge member 1080 and be formed of any of the materials referred to above for cores and/or layers. In one embodiment, the ring members 1076, 1078 do not include spring elements. In another embodiment, the cores 1094, 1095 are not included.

In yet another embodiment, two or more layers are formed over the spring elements 1092, 1093, similar to the multiple layers described above for FIGS. 6-7. In one embodiment, a first layer is formed over the spring elements 1092, 1093 and is formed of an elastomer. In another embodiment, the first layer is formed of a non-conductive polymer, such as FKM. In another embodiment, the first layer is formed of aluminum. One or more layers may then be applied to the first layer and be formed of aluminum, a ceramic such as $Al_2O_3$, $Y_2O_3$, and/or a polymer such as FFKM.

The above-provided examples of FIGS. 4-8, 10A and 10B provide seals with unique geometry having multi-seal architectures, where each ring member provides a respective seal. The examples including layers (e.g., thin film coatings) disposed on cores provide improved chemical resistance and reduce surface roughness, depending on the materials and formation process. Chemical resistance is important in certain applications where the chemicals used attack and degrade certain materials. Multiple layers may be deposited sequentially. In one embodiment, a single solid layer is deposited. The layers may be deposited to smooth out any small imperfections in the cores and/or any intermediate layers. This smoothing out of the layers provides improved sealing with reduced permeation and leak-by rates.

The above-described seals may include cores formed of inexpensive polymers and one or more thin outer layers formed of a chemical resistant material. This provides cost savings over a seal (e.g. an O-ring) formed entirely of a chemical resistant material. The cost savings are increased for a tool that includes numerous seals. Thin film coatings may be applied on large batches of seals concurrently and may be applied on inexpensive cores, which can significantly reduce costs.

The examples of FIGS. 4-8, 10A and 10B also provide seals with multiple sealing surfaces having fewer parts than the examples of FIGS. 2, 9A and 9B, where multiple O-rings (i.e. multiple parts) are used. The examples of FIGS. 4-8, 10A and 10B include the use of a single part while providing seal structures that allow for purging of fluids from between the sealed surfaces.

The multiple layers of the examples disclosed herein may provide a significant reduction in permeation and provide an impenetrable barrier to water and oxygen molecules. The multiple layers may be applied over and irrespective of cores having various different geometries.

Figure 11:
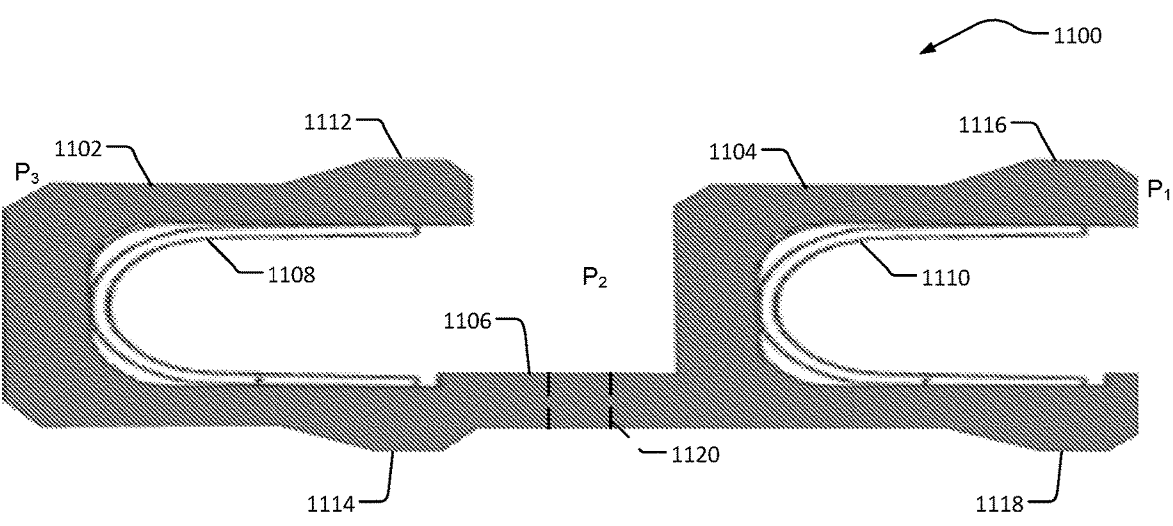
FIG. 11 is a cross-sectional view of an example of a portion of dual-ringed spring energized seal including dual spring elements in accordance with the present disclosure.

FIG. 11 shows an example of a portion 1100 of dual-ringed spring energized seal (or band) that includes two ring members (or band members) 1102, 1104, which are 'U'-shaped, a bridge member (or band member) 1106, and spring elements 1108, 1110. The ring elements include outward protruding portions 1112, 1114 and 1116, 1118. The bridge member 1106 may include holes (one hole 1120 is shown). The spring elements 1108, 1110 are disposed in the ring members 1102, 1104 and apply outward pressure on the outward protruding portions 1112, 1114, 1116, 1118 to apply pressure on adjacent bodies to provide respective seals. As an example, the dual-ringed spring energized seals may replace the seals shown in FIGS. 5, 10A and 10B.

The ring members 1102, 1104 and the bridge member 1106 may be formed of any of the above-stated materials of the other seals referred to above. The ring members 1102, 1104 and bridge member 1106 may be formed of one or more materials. In one embodiment, the ring members 1102, 1104 and bridge member 1106 are formed of the same material. In another embodiment, ring members 1102, 1104 and bridge member 1106 include a core and one or more outer layers, as described above with respect to FIGS. 5-7 and 10A-10B. The spring elements 1108, 1110 may be formed of metal and/or other suitable material for providing restoring forces.

The seal 1100 may be installed such that the open ends of the ring members 1102, 1104 are facing a higher pressure area. For example, an area adjacent the open end of the ring member 1104 may be at atmospheric pressure while an area adjacent a closed end of the ring member 1102 may be at vacuum or a pressure lower than atmospheric pressure. This aid is expanding the ring members 1102, 1104 to further seal off the corresponding sealing interface between bodies being sealed. Although the bodies are not shown in FIG. 11, pressure designators $P_1$, $P_2$, and $P_3$ are shown to indicate differences in pressure areas separated by the ring members 1102, 1104. Pressure $P_2$ may be less than pressure $P_1$ and pressure $P_3$ may be less than or equal to pressure $P_2$.

Figure 12:
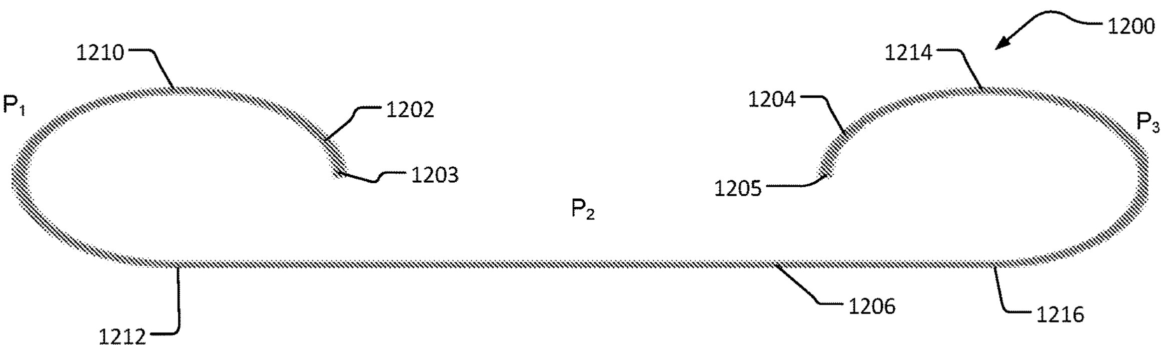
FIG. 12 is a cross-sectional view of a portion of a dual-ringed metal seal in accordance with the present disclosure.

FIG. 12 shows a portion of a dual-ringed metal seal (or band) 1200 that includes two ring members (or band members) 1202, 1204 and a bridge member (or intermediary band member) 1206. The two-ring members 1202, 1204 may have circular shaped cross-sections and have open portions that extend along inner edges 1203, 1205. The two ring members 1202, 1204 perform as spring elements and apply outward pressure at points 1210, 1212, 1214, 1216 similar to the seals of FIGS. 5, 10A, and 11. The dual-ringed metal seal 1200 may be formed of metal and/or other suitable material for providing restoring forces. The metal seal 1200 may seal an interface between bodies similar to that described above. Although the bodies are not shown in FIG. 12, pressure designators $P_1$, $P_2$, and $P_3$ are shown to indicate differences in pressure areas separated by the ring members 1202, 1204. Pressure $P_2$ may be less than pressure $P_1$ and pressure $P_3$ may be less than or equal to pressure $P_2$.

Figure 13:
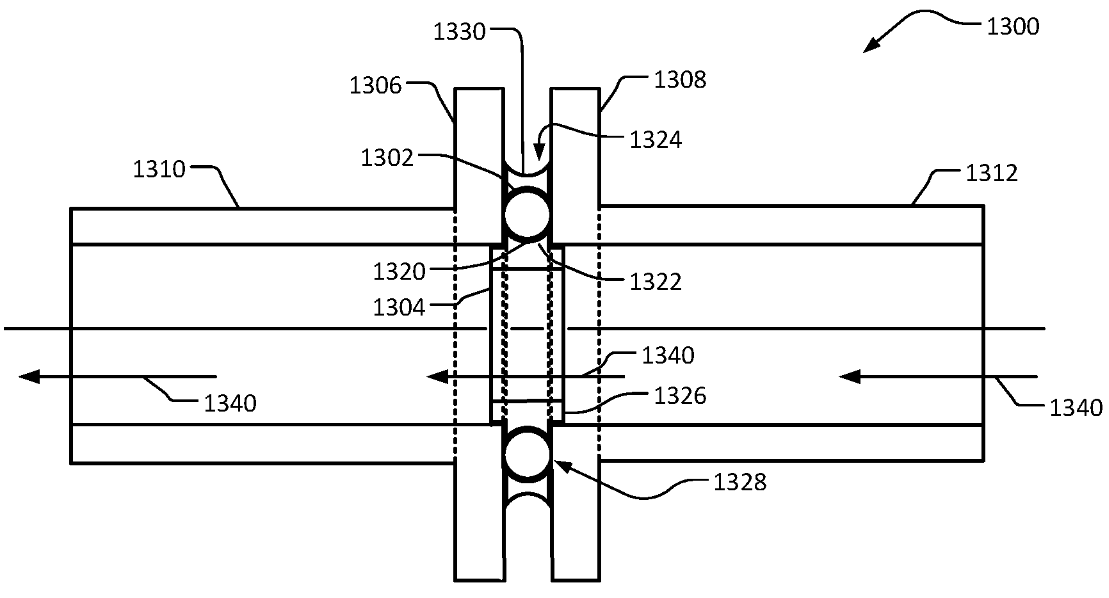
FIG. 13 is a cross-sectional view of another example of a sealing system including a seal supported by a centering ring, including a single band member and disposed between pipe flanges in accordance with the present disclosure.
Figure 14:
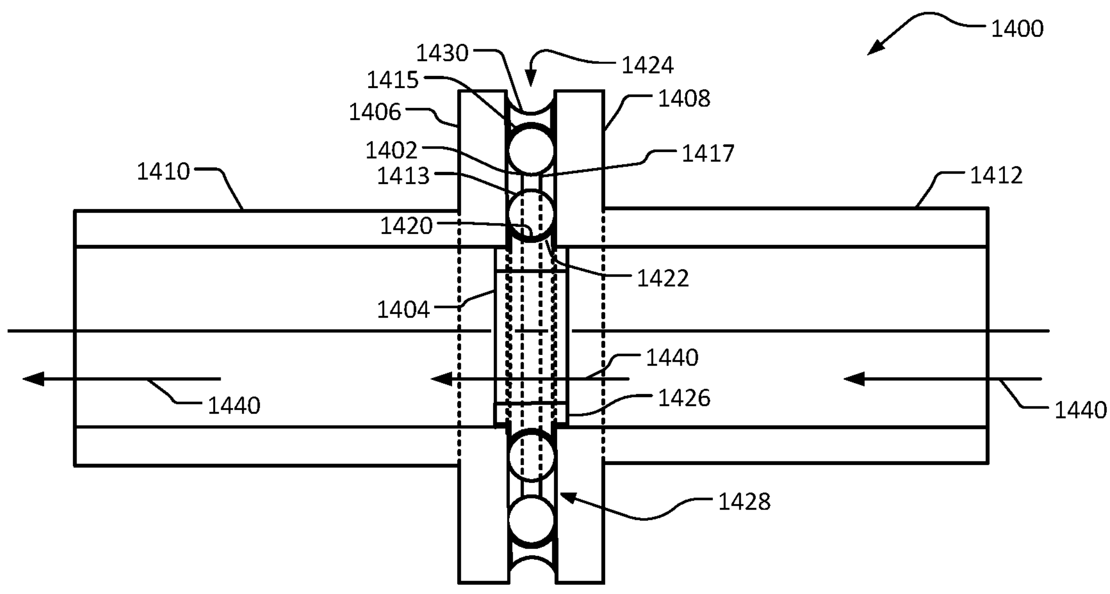
FIG. 14 is a cross-sectional view of another example of a sealing system including a seal supported by a centering ring, including dual band members and a bridge member, and disposed between pipe flanges in accordance with the present disclosure.

FIG. 13 shows a sealing system 1300 including a seal 1302 supported by a centering ring 1304 and disposed between pipe flanges 1306, 1308 of respective pipes 1310, 1312. The seal 1302 may include a single seal band as shown or may include two or more seal bands (or band members) and one or more bridge members as disclosed herein. For example, any of the seals of FIGS. 3-8 may replace the seal 1302. When the seal 1302 includes two or more bands, the bands are disposed radially (an example of which is shown in FIG. 14). For example, if the seal 1302 includes two bands (or band members) and a bridge member, a first band is disposed radially inward of the second band and may be coupled to the second band by a radially extending bridge member. Each of the bands are disposed between and contact the flanges 1306, 1308. The seal 1302 may be pressed between the flanges 1306, 1308. As a couple of examples, the flanges 1306, 1308 may be fastened together via fasteners and/or held together via a clamp.

The centering ring 1304 may include a radially outer concave surface 1320 on which the seal 1302 is supported. The centering ring 1304 includes (i) a radially outer portion 1322 that extends into an interface area 1324 and contacts the seal 1302, and (ii) a lip 1326 that extends over longitudinal portions of the flanges 1306, 1308. The seal 1302 provides fluid seals at surfaces of the seal 1302 that are in contact with the flanges 1306, 1308. The centering ring 1304 may be used to control face-to-face geometric separation between the flanges 1306, 1308.

An external ring 1330 may be included and surround the seal 1302. The external ring 1330 may have a radially inner concave surface 1332. The seal 1302 may be disposed between the concave surfaces 1320, 1332 of the rings 1304, 1330. The centering ring 1304 centers the seal 1302 into a pocket 1328 between the flanges 1306, 1308 and between the rings 1304, 1330. The external ring 1330 prevents the seal 1302 from expanding outwards and leaking. The external ring 1330 may be included when, for example, pressures internal to the pipes 1310, 1312 can exceed atmospheric pressure and/or pressures external to the pipes 1310, 1312.

As an example, the pipes 1310, 1312 may be used to transfer processing gases, represented by arrows 1340 to a substrate processing system. The seal 1302 is applicable to planar surfaces, such as the planar surfaces of the flanges 1306, 1308. The rings 1304 and 1330 may be formed of a metallic material, such as aluminum.

FIG. 14 shows a sealing system 1400 including a seal 1402 supported by a centering ring 1404 and disposed between pipe flanges 1406, 1408 of respective pipes 1410, 1412. The seal 1402 may includes two or more seal bands (two seal bands 1413, 1415 are shown) and one or more bridge members (one bridge member 1417 is shown) as disclosed herein. The seal 1402 may be configured similarly as one of the seals of the seals of FIGS. 4-8. Each of the bands are disposed between and contact the flanges 1406, 1408. The band 1415 is disposed radially outward and surrounds the band 1413. The bands 1413, 1415 may be pressed between the flanges 1406, 1408. As a couple of examples, the flanges 1406, 1408 may be fastened together via fasteners and/or held together via a clamp.

The centering ring 1404 may include a radially outer concave surface 1420 on which the seal 1402 is supported. The centering ring 1404 includes (i) a radially outer portion 1422 that extends into an interface area 1424 and contacts the seal 1402, and (ii) a lip 1426 that extends over longitudinal portions of the flanges 1406, 1408. The seal 1402 provides fluid seals at surfaces of the seal 1402 that are in contact with the flanges 1406, 1408. The centering ring 1404 may be used to control face-to-face geometric separation between the flanges 1406, 1408.

An external ring 1430 may be included and surround the seal 1402. The external ring 1430 may have a radially inner concave surface 1432. The seal 1402 may be disposed between the concave surfaces 1420, 1432 of the rings 1404, 1430. The centering ring 1404 centers the seal 1402 into a pocket 1428 between the flanges 1406, 1408 and between the rings 1404, 1430. The external ring 1430 prevents the seal 1402 from expanding outwards and leaking. The external ring 1430 may be included when, for example, pressures internal to the pipes 1410, 1412 can exceed atmospheric pressure and/or pressures external to the pipes 1410, 1412.

As an example, the pipes 1410, 1412 may be used to transfer processing gases, represented by arrows 1440 to a substrate processing system. The seal 1402 is applicable to planar surfaces, such as the planar surfaces of the flanges 1406, 1408. The rings 1404 and 1430 may be formed of a metallic material, such as aluminum.

In an embodiment, contents (e.g., ambient air and/or one or more gases) in a cavity between the bands 1413, 1415 is pumped out, similar to that described above for the embodiment of FIG. 2. The bridge member 1417 may be perforated, such that contents on both sides of the bridge member 1417 may be pumped out. Depending on the application, ambient air at atmospheric pressure (or a high pressure) may permeate through or leak by the band 1415 or a processing gas at high pressure may permeate through or leak by the band

1413 and enter the cavity between the bands 1413, 1415. When the pressure outside the pipes 1410, 1412 is higher than a pressure within the pipes 1410, 1412, ambient air outside the pipes 1410, 1412 may permeate through or leak by the band 1415 and enter the cavity between the bands 1413, 1415. When the pressure inside the pipes 1410, 1412 is higher than the pressure outside of the pipes 1410, 1412, a gas within the pipes may permeate through or leak by the band 1413 and enter the cavity between the bands 1413, 1415.

In one embodiment, a first pump is used to pump out the contents of the cavity between the bands 1413, 1415 and a second pump is used to pump out contents in the pipes 1410, 1412. The pumps may be controlled by the controller 117 of FIG. 1. In one embodiment, the pumps differentially pump the contents from the interface between the bands 1413, 1415 and the contents from the pipes 1410, 1412 to provide a differential in pressure across the band 1413. In this example, pressure within the pipes 1410, 1412 is lower than a pressure within the cavity between the bands 1413, 1415.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can include semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from multiple fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by including one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A system for evacuating a cavity, the system comprising:

a first body;

a second body comprising a channel recessed within the second body;

a seal to prevent fluid through a first interface between the seal and the first body, and through a second interface between the first body and the second body, the seal being disposed in the channel and comprising a first band member defining a first band seal surface on first side of the first band member, the first band member configured to provide a first fluid seal with the first body when compressed to the first body, a second band member defining a second band seal surface on a first side of the second band member, the second band member configured to provide a second fluid seal with the first body when compressed to the first body, wherein the first band member and the second band member at least partially define a cavity between the first band member and the second band member, and a bridge member extending through the cavity and connecting the first band member to the second band member;

a pump; and a controller configured to control the pump to evacuate the cavity, wherein the cavity is located in the channel between the first band member and the second band member.

2. The system of claim 1, wherein the bridge member is perforated.

3. The system of claim 1, wherein the first band member, the second band member and the bridge member are annular-shaped or rectangular- shaped.

4. The system of claim 1, wherein:

the first band member separates a first region from the cavity;

the second band member separates a second region from the cavity;

the first region is at a first pressure;

the second region is at a second pressure that is less than the first pressure; and the cavity is at an intermediate pressure that is less than the first pressure and greater than or equal to the second pressure.

5. The system of claim 1, wherein:

a diameter at a radially inner surface of the second band member is greater than a diameter at a radially outer surface of the first band member; and the bridge member comprises a radially inner surface connected to the radially outer surface of the first band member, and a radially outer surface connected to the radially inner surface of the second band member.

6. The system of claim 1, further comprising one or more layers disposed on the first band member, the second band member and the bridge member.

7. The system of claim 1, wherein:

the first band member defines a third band seal surface on an opposite side as the first side and configured to provide a third fluid seal with the second body when compressed between the first body and the second body; and the second band member defines a fourth band seal surface on an opposing side as the second band seal surface and configured to provide a fourth fluid seal with the second body when compressed between the first body and the second body, wherein the cavity is between the first body and the second body.

8. The system of claim 7, wherein:

the first band member and the second band member have open circularly-shaped cross-sections;

the first band member includes a first inner edge;

the second band member includes a second inner edge; and when the first band member and the second band member are compressed between the first body and the second body, the first inner edge and the second inner edge move closer to the bridge member.

9. A system comprising:

a first body;

a second body comprising a channel recessed within the second body;

a seal disposed in the channel and to prevent fluid through a first interface between the seal and the first body, the seal comprising a first band member defining a first band seal surface on first side of the first band member, the first band member configured to provide a first fluid seal with the first body when compressed to the first body, a second band member defining a second band seal surface on a first side of the second band member, the second band member configured to provide a second fluid seal with the first body when compressed to the first body, wherein the first band member and the second band member at least partially define a cavity between the first band member and the second band member; and a bridge member extending through the cavity and connecting the first band member to the second band member, wherein the seal prevents fluid through a second interface between the first body and the second body, the first band member defines a third band seal surface on an opposite side as the first side and configured to provide a third fluid seal with the second body when compressed between the first body and the second body, the second band member defines a fourth band seal surface on an opposing side as the second band seal surface and configured to provide a fourth fluid seal with the second body when compressed between the first body and the second body, the cavity is between the first body and the second body, the first band member and the second band member have open circularly-shaped cross-sections, the first band member includes a first inner edge, the second band member includes a second inner edge, and when the first band member and the second band member are compressed between the first body and the second body, the first inner edge and the second inner edge move closer to the bridge member;

a pump; and a controller configured to control the pump to evacuate the cavity, wherein the cavity is located in the channel between the first band member and the second band member.

10. The system of claim 1, wherein the seal is configured to prevent fluid through another interface between the first body and the second body, wherein:

the seal comprises a core formed of aluminum, and one or more layers disposed on an outer surface of the core and configured to define the first band seal surface and the second band seal surface when compressed between the first body and the second body, respectively, and at least one of the one or more layers is formed of a perfluoroelastomer.

11. The system of claim 10, wherein the core is annular-shaped or rectangular-shaped.

12. The system of claim 10, wherein:

the one or more layers comprise a first layer disposed on the core and formed of a first material, and a second layer disposed on the first layer and formed of a second material, wherein the second material is different than the first material; and at least one of the first layer or the second layer is formed of a perfluoroelastomer.

13. The system of claim 10, wherein the seal is a spring energized seal.

14. A system comprising:

a first body;

a second body comprising a first channel and a second channel recessed within the second body;

a first seal disposed in the first channel and to prevent fluid through an interface between the first seal and the first body, the first seal comprising a first band member defining a first band seal surface on first side of the first band member, the first band member configured to provide a fluid seal with the first body when compressed to the first body, a second band member defining a second band seal surface on a first side of the second band member, the second band member configured to provide another fluid seal with the first body when compressed to the first body, wherein the first band member and the second band member at least partially define a cavity between the first band member and the second band member, and a bridge member extending through the cavity and connecting the first band member to the second band member;

wherein the first seal comprises a core formed of aluminum, and one or more layers disposed on an outer surface of the core and configured to define the first band seal surface and the second band seal surface when compressed between the first body and the second body, respectively, and at least one of the one or more layers is formed of a perfluoroelastomer;

a second seal disposed in the second channel;

a pump; and a controller configured to control operation of the pump to evacuate fluid from the interface via a plenum and at a location between the first body and the second body and between the first seal and the second seal.

15. The system of claim 1 configured to prevent fluid through an interface between the first body and the second body, wherein:

the seal comprises a core formed of a polymer, and one or more layers disposed on the core and configured to define the first band seal surface and the second band seal surface when compressed between the first body and the second body, respectively; and at least one of the one or more layers is formed of at least one of aluminum or a perfluoroelastomer.

16. The system of claim 15, wherein the core is annular-shaped or rectangular-shaped.

17. The system of claim 15, wherein:

the one or more layers comprise a first layer disposed on the core and formed of a first material, and a second layer disposed on the first layer and formed of a second material, wherein the second material is different than the first material; and at least one of the first layer or the second layer is formed of at least one of aluminum or a perfluoroelastomer.

18. The system of claim 15, wherein the seal is a spring energized seal.

19. A system comprising:

a first body;

a second body comprising a first channel and a second channel recessed within the second body;

a first seal disposed in the first channel and to prevent fluid through an interface between the first seal and the first body, the first seal comprising a first band member defining a first band seal surface on first side of the first band member, the first band member configured to provide a first fluid seal with the first body when compressed to the first body, a second band member defining a second band seal surface on a first side of the second band member, the second band member configured to provide a second fluid seal with the first body when compressed to the first body, wherein the first band member and the second band member at least partially define a cavity between the first band member and the second band member, and a bridge member extending through the cavity and connecting the first band member to the second band member, wherein the first seal comprises a core formed of a polymer, and one or more layers disposed on the core and configured to define the first band seal surface and the second band seal surface when compressed between the first body and the second body, respectively; and at least one of the one or more layers is formed of at least one of aluminum or a perfluoroelastomer; a second seal disposed in the second channel; a pump; and a controller configured to control operation of the pump to evacuate fluid from a gap in the interface, wherein the gap is located between the first body and the second body and between the first seal and the second seal.

20. The system of claim 1, wherein the first band member, the second band member and the bridge member define a dumbbell-shaped cross-section.

21. The system of claim 1, wherein the seal is a spring energized seal.

22. The system of claim 1, wherein:

the first band member comprises a first spring element; and the second band member comprises a second spring element.

23. The system of claim 1, wherein the first band member, the second band member and the bridge member are formed of metal.

24. The system of claim 5, further comprising:

a third band member defining fifth and sixth band seal surfaces on opposing sides thereof that are configured to provide third fluid seals with the first body and the second body, respectively, when compressed between the first body and the second body, wherein the third fluid seals are located radially outside of the second fluid seal and a diameter at a radially inner surface of the third band member is greater than a diameter at a radially outer surface of the second band member; and a second bridge member including a radially inner surface that is connected to the radially outer surface of the second band member and a radially outer surface that is connected to the radially inner surface of the third band member.

25. The system of claim 9, wherein:

the first body is a housing of a metrology device or a wall of a substrate processing chamber; and the second body is the other one of the housing of the metrology device or the wall of the substrate processing chamber.

26. The system of claim 9, wherein:

the first body is a lid or a wall of a substrate processing chamber; and the second body is the other one of the lid or the wall of the substrate processing chamber.

27. The system of claim 9, wherein:

the first body is a component of an assembly or a wall of a substrate processing chamber;

the second body is the other one of the component of the assembly or the wall of the substrate processing chamber; and the assembly is a species delivery assembly, a transport assembly or a species exhaust assembly.

28. The seal of claim 21, wherein the seal is a dual-ringed spring energized seal that is annularly shaped.

29. The seal of claim 28, wherein:

the first band member comprises a first ring member that has a 'U'-shaped cross-section; and the second band member comprises a second ring member that has a 'U'-shaped cross-section.

30. The seal of claim 29, wherein:

the first band member comprises a first spring element disposed in the first ring member and has a 'U'-shaped cross-section; and the second band member comprises a second spring element disposed in the second ring member and has a 'U'-shaped cross-section.

31. The seal of claim 23, wherein:

the seal is a dual-ringed metal band that is annularly shaped, where the first band member and the second band member have circular-shaped cross-sections with respective open inner portions along respective inner edges of the first band member and the second band member; and the inner edges are separated from the bridge member to provide the open inner portions.

32. The system of claim 1, wherein the controller is configured to control the pump to evacuate the cavity to a pressure that is less than atmospheric pressure.

33. The system of claim 1, wherein the pump is configured to pump gas out of the cavity.

34. The system of claim 1, wherein the pump is configured to evacuate the cavity without pumping gas to the cavity.

35. The system of claim 1, wherein the second body has a unitary structure.

36. The system of claim 1, wherein the second body is separate from the first body.

37. The system of claim 1, wherein:

the first band member is configured to provide the first fluid seal with a first surface of the first body and a third fluid seal with a second surface of the second body;

the second band member is configured to provide the second fluid seal with the first surface of the first body and a fourth fluid seal with the second surface of the second body; and the channel of the second body includes the second surface.

38. The system of claim 37, wherein the second surface extends parallel to the first surface.

39. The system of claim 37, wherein the first surface and the second surface extend radially.

40. The system of claim 37, wherein the first surface and the second surface extend axially.

* * * * *